(12) United States Patent
Abarzadeh et al.

(10) Patent No.: US 12,500,509 B2
(45) Date of Patent: Dec. 16, 2025

(54) ELECTRIC POWER CONVERTER

(71) Applicant: SMARTD TECHNOLOGIES INC., Montréal (CA)

(72) Inventors: Mostafa Abarzadeh, Montréal (CA); Simon Caron, Outremont (CA); Fadia Sebaaly, Montréal (CA)

(*) Notice: Subject to any disclaimer, the term of this patent is extended or adjusted under 35 U.S.C. 154(b) by 434 days.

(21) Appl. No.: 18/245,173

(22) PCT Filed: Oct. 5, 2021

(86) PCT No.: PCT/CA2021/051391
§ 371 (c)(1),
(2) Date: Mar. 14, 2023

(87) PCT Pub. No.: WO2022/073111
PCT Pub. Date: Apr. 14, 2022

(65) Prior Publication Data
US 2023/0369964 A1    Nov. 16, 2023

Related U.S. Application Data

(60) Provisional application No. 63/087,631, filed on Oct. 5, 2020.

(51) Int. Cl.
*H02M 1/12* (2006.01)
*H02M 1/00* (2007.01)
(Continued)

(52) U.S. Cl.
CPC ......... *H02M 1/126* (2013.01); *H02M 1/0054* (2021.05); *H02M 1/44* (2013.01); *H02M 5/4585* (2013.01); *H02M 7/4837* (2021.05); *H02M 7/487* (2013.01); *H02M 7/797* (2013.01); *H02P 27/08* (2013.01)

(58) Field of Classification Search
CPC .......... H02P 27/06; H02P 27/08; H02P 27/04; H02M 1/126; H02M 1/007; H02M 1/0095; H02M 7/4837; H02M 7/487; H02M 1/44; H02M 3/07; H02M 3/156; H02M 3/158; H02M 5/4585; H02M 7/797

See application file for complete search history.

(56) References Cited

U.S. PATENT DOCUMENTS

2019/0363644 A1* 11/2019 Li ........................ H02M 7/5387

FOREIGN PATENT DOCUMENTS

CA    3005583 A1    11/2019

OTHER PUBLICATIONS

International application No. PCT/CA2021/051391 International Search Report dated Jan. 4, 2022.
(Continued)

*Primary Examiner* — Antony M Paul
(74) *Attorney, Agent, or Firm* — Anglehart et al.

(57) ABSTRACT

A converter with lower passive filter size and increased flying capacitor charging speed during the converter start-up uses a combination of a multi-level power converter circuit having a flying capacitor in which the first switching harmonic cluster is at twice the switching frequency and an integrated double-stage filter designed to allow the flying capacitor to be efficiently balanced and to allow noise from the harmonic clusters and from switches in the power converter circuit to be suppressed. This provides for a compact power conversion apparatus.

10 Claims, 16 Drawing Sheets

(51) Int. Cl.
*H02M 1/44* (2007.01)
*H02M 5/458* (2006.01)
*H02M 7/483* (2007.01)
*H02M 7/487* (2007.01)
*H02M 7/797* (2006.01)
*H02P 27/08* (2006.01)

(56) References Cited

OTHER PUBLICATIONS

International application No. PCT/CA2021/051391 Search Strategy dated Jan. 4, 2022.
International application No. PCT/CA2021/051391 Written Opinion of the International Searching Authority dated Jan. 4, 2022.
Abarzadeh, M. et al., "A Modified Static Ground Power Unit Based on Active Natural Point Clamped Converter", 2015 IEEE Energy Conversion Congress and Exposition (ECCE), Sep. 24, 2015 (Sep. 24, 2015), pp. 3508-3514.
Meynard, T. et al., "Multicell Converters: Basic Concepts and Industry Applications", IEEE Transactions of Industrial Electronics, Oct. 2002 (Oct. 2002), vol. 49, No. 5, pp. 955-964.
McGrath, B. et al., "Natural Capacitor Voltage Balancing for a Flying Capacitor Converter Induction Motor Drive", IEEE Transactions on Power Electronics, Jun. 2009 (Jun. 2009), vol. 24, No. 6, pp. 1554-1561.
"IEEE Recommended Practices and Requirements for Harmonic Control in Electrical Power Systems". IEEE Std 519-1992. Revision of IEEE Std 519-1981. IEEE Industry Application Society/Power Engineering Society. Published by the Institute of Electrical and Electronic Engineers, Inc., Apr. 12, 1993.
Thomas M. Blooming et al., "Application of IEEE Std 519-1992 harmonic limits". Published in: Conference Record of 2006 Annual Pulp and Paper Industry Technical Conference. Date of Conference: Jun. 18-23, 2006. Date Added to IEEE Xplore: Aug. 21, 2006. DOI: 10.1109/PAPCON.2006.1673767.
P. Barbosa, et al., "Active Neutral-Point-Clamped Multilevel Converters," in 2005 IEEE 36th Power Electronics Specialists Conference, 2005, pp. 2296-2301.
S. Busquets-Monge, et al., "A Multilevel Active-Clamped Converter Topology—Operating Principle," IEEE Transactions on Industrial Electronics, vol. 58, pp. 3868-3878, 2011.
S. Amarir, et al., "A new design tool to protect industrial long-cable PWM ASD systems against high-frequency overvoltage problems," Canadian Journal of Electrical and Computer Engineering, vol. 33, pp. 125-132, 2008.

* cited by examiner

ELECTRIC POWER CONVERTER

This patent application claims priority from U.S. provisional patent application Ser. No. 63/087,631 filed 5 Oct. 2020, the content of which is hereby incorporated by reference.

TECHNICAL FIELD

The present relates to the field of power electronics and electrical converters, such as motor drives.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Along with the increasing use of renewable energy conversion system such as photovoltaic systems and wind power systems, a large demand for efficient, power-dense and lightweight grid-interface inverters is arising. Furthermore, efficient converters and inverters are widely used in electric motor drives and especially variable frequency drives. Some other applications of inverters are uninterruptible power supply (UPS) systems, battery chargers and ground power units (GPU) for aircrafts.

Variable speed drives (VSDs), also known as adjustable speed drives (ASDs), or variable frequency drives (VFDs) are used to control the speed of electric motor machinery. Many industrial processes such as assembly lines must operate at different speeds for different products. Where process conditions demand adjustment of flow from a pump or fan, varying the speed of the drive may save energy compared with other techniques for flow control.

In recent years, different solutions have been suggested to increase the power density of the converter particularly for use in VSDs and renewable energy conversion system. Some examples such suggestions are use of high-resolution multilevel converters (MLC), and use of very high frequency power electronic converters (PECs) by employing wide bandgap (WBG) devices, which leads to adopting passive L, LC, and LCL filters to interconnect the active front end (AFE) rectifier to the grid, or adopting smaller required passive filters to improve the input signal waveform in conventional AC drive motors. However, these solutions have proven to have disadvantages as explained below.

To achieve higher number of output voltage levels in traditional MLCs, the number of required components including isolated DC-power supplies, DC-links and flying capacitors, power switches and diodes are tremendously increased. In addition, at the higher number of voltage levels, the complexity of control, and modulation methods of traditional MLCs is substantially increased. Hence, the cost, size, and complexity of the conventional high-resolution MLCs are substantially increased, and the power density and reliability are consequently decreased. Therefore, employing multilevel converters in various industrial applications such as variable frequency drives (VFD) necessitate remarkable amelioration of the MLCs configurations and modulation methods that constitute a big challenge for future industrial development.

Also, employing very high switching frequency in WBG device-based PECs leads to extra electromagnetic interference (EMI), high dv/dt, and high reflected wave voltage overshoot ratio especially in long cable fed motor drives. Moreover, high dv/dt results in significant common mode (CM) current because of exciting capacitive paths in PECs. Accordingly, high CM current leads to damage the winding insulation of passive components in PECs and motor windings as well. For instance, the high-frequency spectrum of output switching waveform is increased by 20-30 dB and dv/dt at the inverter output is quintupled at high switching frequency. Moreover, high dv/dt causes insulation and bearing damages in motor drives. Furthermore, in motor drives, if the propagation time of the connected cable between PEC and motor is more than ⅓ of the switching rise time, a full reflection will occur at the motor terminals.

Passive L filters were first adopted to interconnect the AFE rectifier with the grid, however, with the introduction of IEEE 519-1992 standard, the L filter size and rating became very large to satisfy the harmonics requirements. Consequently, the total cost of power electronic converter is increased, and its power density is reduced drastically. Even though LC filters can be a substitution, the filter remains bulky and costly since the size of the filter inductor remains unchanged. To overcome this problem, attempts in the literature adopted the design of LCL filters [10-16]. In fact, when compared to other conventional L and LC filters, LCL filters are less bulky. Although the introduced LCL filter configuration shows good performance, stability and higher harmonic attenuation, the need for an optimized design employing a low-cost and smaller filter with a reliable MLC-PWM method remains a challenge in the AFE rectifier applications. Moreover, large value and size of L, LC, and LCL filter make it difficult to integrate the passive filter into the converter in one enclosure.

However, conventional VFDs that use LC filter with CM filter components require damping configurations (passive and active) for improving the input signal waveform given to the motor. Also, operating with LC filter requires a trade off between the output voltage dynamics (namely the ability to dynamically increase/decrease the output voltage—the slew rate) and the attenuation of high frequency output voltage harmonics required for the conducted EMI requirement.

Furthermore, most of these solutions do not offer bidirectional and/or regenerative braking capability for VFDs, unity power factor (PF), or sinusoidal input current.

Therefore, there exists a need for a converter design with high power density, more efficient switching arrangement increasing the converter efficiency, and reduced dv/dt which results in reducing common mode (CM) current caused by the exciting capacitive paths in power electronic converters.

Also, there is a need a converter with lower passive filter size and increased FC charging speed during the converter start-up.

SUMMARY

Accordingly, the applicant has provided a solution to solve above-mentioned problems by providing a combination of a multi-level power converter circuit having a flying capacitor in which the first switching harmonic cluster is at twice the switching frequency and a new integrated double-stage filter designed to allow the flying capacitor to be efficiently balanced and to allow noise from the harmonic clusters and from switches in the power converter circuit to be suppressed. This provides for a compact power conversion apparatus. Using wide bandgap (WBG) switches in the low voltage, high frequency switches of the power converter circuit allows the switching frequency to be a high frequency, namely higher than 50 kHz and preferably around 85 kHz to 120 kHz. Higher frequencies are possible but generally unnecessary to achieve a smooth output voltage waveform (whether AC or DC). At a switching frequency below 85 kHz, the size of the filter can be a burden. The power converter circuit can use a hybrid combination of silicon based power devices for the low frequency switches and WBG based power switches for the high frequency switching part. The WBG switches can comprise, for example, GaN or SiC MOSFETs.

In some embodiments, a bidirectional hybrid WBG based multi level converter having multiple advantages in comparison to state-of-the-art converter technologies. In some examples, the present disclosure provides a pure sine bidirectional hybrid WBG based five-level converter with integrated double stage filter for VFD applications. Major advantages of the proposed configuration in comparison to state-of-the-art converter technologies are as follows In one improvement, the present disclosure provides a bidirectional back-to-back converter may be comprised of back-to-back high-power density hybrid WBG based five-level active-neutral-point-clamped (ANPC) converter which is capable of bidirectional power flow. In one example, a five-level bidirectional ANPC converter is proposed which, in both AFE rectifier and VFD sides, uses low frequency (LF) MOSFETs or WBG cell which operate at fundamental frequency and high voltage and employs WBG based MOSFETs cells which operate at high frequency and low voltage.

This may provide the VFDs with regenerative braking capability. Also, this solution provides unity power factor (PF), and sinusoidal input current for the converter.

In another improvement, a decoupled PWM method is proposed for the suggested hybrid WBG based five-level ANPC converter in both AFE rectifier and VFD sides. Therefore, in some examples of the suggested hybrid WBG based configuration of the five-level ANPC, silicon (Si) based super junction MOSFET devices or WBG are employed in the high-voltage low-frequency cell because of very low on-state resistance and conduction losses, and Gallium Nitride (GaN) WBG devices are used in the low-voltage high-frequency cell because of very low switching losses. Accordingly, such innovative design not only provides a high-power density hybrid WBG based converter, but also reduces dv/dt remarkably.

In one other improvement, the present disclosure provides a novel single carrier sensor-less modulation method is proposed for the five-level AFE rectifier and motor drive to improve harmonic spectrum of the five-level ANPC converter voltage and to provide sensor-less voltage balancing of the dc-link and flying capacitors. By applying the proposed single carrier modulation method, the first switching harmonic cluster of the output voltage may be doubled and odd multiples of the switching harmonic clusters are canceled out. Moreover, the flying capacitor (FC) is charged and discharged with switching frequency which leads to significant reduction of the FC value and size.

The fourth improvement provided in the present disclosure is an integrated double-stage LC filter which may be employed in the back-to-back 5L-ANPC topology at both the grid and load sides. A novel design procedure is proposed to optimize the double-stage LC filter size and increase the FC charging speed during the converter start-up. Therefore, combining both advantages of operating at high switching frequency with the WBG devices and of PWM technique that shifts the first harmonic spectrum at twice the switching frequency, an integrated double-stage filter is obtained. The proposed design presents several features at both AFE and motor side where the filter is integrated with the overall topology which lead to a reduced size, increased power density when compared to conventional structure.

In one broad aspect, the present disclosure provides a multi-level bidirectional power converter comprising an AC port and a DC port and various types of power devices; one type of bidirectional conversion cell having Silicon Carbide based power switches employed in both low-frequency and high-frequency parts, this bidirectional conversion cell connected to said AC and DC ports; another type of bidirectional conversion cell having Gallium Nitride switches employed in both low-frequency and high-frequency parts, this bidirectional conversion cell connected to said AC and DC ports; and at least one controller connected to said first bidirectional conversion cell and said second bidirectional conversion cell, wherein when the current received by the multi-level bidirectional power converter is high voltage, said controller converts current received using said first bidirectional conversion cell and when the current received has a low voltage said controller converts the current using said second bidirectional conversion cell.

In some embodiments of the multi-level bidirectional power converter, the first bidirectional conversion cell and said second bidirectional conversion cell have a back-to-back design.

In some embodiments of the multi-level bidirectional power converter, the first bidirectional conversion cell and said second bidirectional conversion cell are five level conversion cells.

In some embodiments, the multi-level bidirectional power converter further comprising integrated double-stage LC filters at said both AC input and AC output ports.

The present disclosure provides a motor controller comprising the multi-level bidirectional power converter as defined in different embodiments in this application. In some examples, the motor controller the multi-level bidirectional power converter may works as a regenerative braking system.

In another broad aspect, the present disclosure provides a multi-level power inverter comprising a DC port for receiving DC current and comprising an AC port for generating AC current at output by utilizing various types of power devices; a first type of inverter cell having Silicon Carbide based switches employed in both low-frequency and high-frequency parts and connected to said DC port; a second type of inverter cell having Gallium Nitride switches employed in both low-frequency and high-frequency parts and connected to said DC port; at least one controller connected to said first inverter cell and said second inverter cell, wherein when the DC current received has high voltage, said controller converts said DC current to AC current using said first inverter cell and when the DC current received has low voltage said controller converts said DC current to AC current using said second inverter cell; and, an AC port for delivering said AC current.

In some embodiments of the multi-level inverter, the first rectifier cell and said second inverter cell have a back-to-back arrangement.

In some embodiments of the multi-level inverter, the first rectifier cell and said second inverter cell are five level inverter cells.

In some embodiments of the multi-level inverter may further comprise an integrated double-stage LC filter at said both AC input and AC output ports.

In another broad aspect, the present disclosure provides a multi-level power rectifier comprising an AC port for receiving AC current and comprising a DC port for generating DC current at output by utilizing various types of power devices; a first type of rectifier cell having Silicon based switches employed in both low-frequency and high-frequency parts and connected to said AC port; a second type of rectifier cell having Gallium Nitride switches employed in both low-frequency and high-frequency parts and connected to said AC port; at least one controller connected to said first rectifier cell and said second rectifier cell, wherein when the AC current received has high voltage, said controller converts said AC current to DC current using said first inverter cell and when the AC current received has low voltage said controller converts said AC current to DC current using said second inverter cell; and, an DC port for delivering said DC current.

In some embodiments of the multi-level rectifier, the first rectifier cell and said second inverter cell have a back-to-back arrangement.

In some embodiments of the multi-level rectifier, the first rectifier cell and said second inverter cell may be five level inverter cells.

In some embodiments the multi-level rectifier may further comprise an integrated double-stage LC filter at both AC input and AC output.

BRIEF DESCRIPTION OF THE DRAWINGS

The invention will be better understood by way of the following detailed description of embodiments of the invention with reference to the appended drawings, in which.

DETAILED DESCRIPTION

Figure 1:
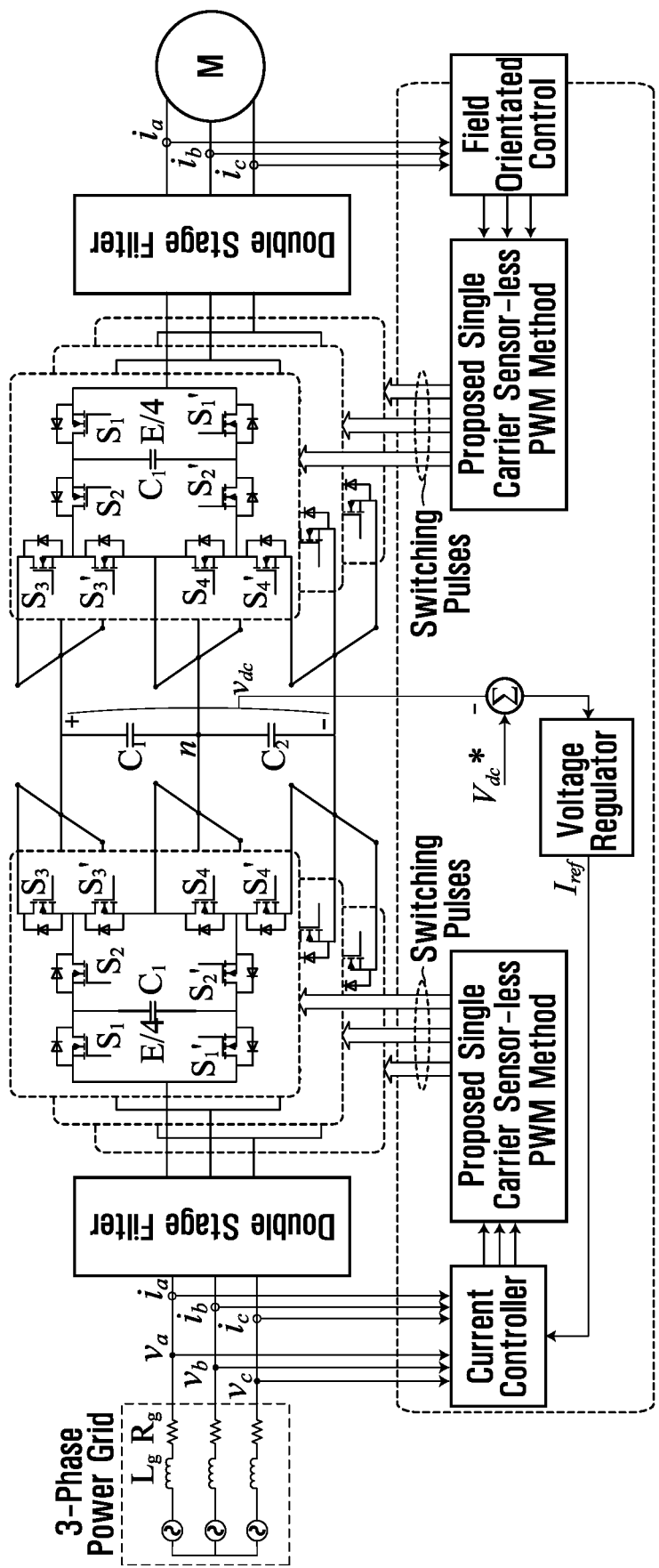
FIG. 1 is a schematic illustration of the overall architecture of the proposed pure sine bidirectional integrated hybrid WBG based five-level converter for VFD applications in accordance with one embodiment of the present invention.

This patent application provides complementary improvements that may be applied separately or in combination.

Reference throughout this specification to "one embodiment," "an embodiment," or similar language means that a particular feature, structure, or characteristic described in connection with the embodiment can be included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

Emerging trends toward high efficiency and high power density integrated power electronic converters (PECs) necessitate significant reduction of the value and size of employed passive components in PECs in order to meet the electromagnetic compatibility (EMC), and harmonic limits mandated by relevant stringent standards. In order to decrease the value of employed passive input and output filters in PECs, two main solutions are provided, implementing a high-resolution multilevel converters (MLC), and using very high frequency PECs by employing wide bandgap (WBG) devices.

Recently, WBG based switching devices including Gallium Nitride (GaN) and Silicon Carbide (SiC) MOSFETs have been considered to be among promising technologies to considerable increase the switching frequency, also remarkable decrease the switching and conduction losses in comparison to Silicon (Si) based IGBTs devices. On the other hand, high switching frequency operation opens the door for the implementation of compact, integrated filters into the GaN based configuration. As a result, it suppresses all switching frequency harmonics at both the utility and the load side. However, employing very high switching frequency in WBG device-based PECs leads to extra electromagnetic interference (EMI), high dv/dt, and high reflected wave voltage overshoot ratio especially in long cable fed motor drives. Moreover, high dv/dt results in significant common mode (CM) current because of exciting capacitive paths in PECs. Accordingly, high CM leads to damage the winding insulation of passive components in PECs and motor windings as well. For instance, the high-frequency spectrum of output switching waveform can be increased by 20-30 dB and dv/dt at the inverter output can be quintupled at the high switching frequency. Moreover, high dv/dt causes insulation and bearing damages in motor drives. Furthermore, in motor drive, if the propagation time of the connected cable between PEC and motor can be more than ⅓ of the switching rise time, a full reflection will be occurred at the motor terminals.

The MLCs have emerged as promising state-of-the art power converters to achieve high-resolution output waveform, low ameliorated EMI and lower harmonic contents, as well as reduced switching frequency. The main conventional configurations available for the industry belonging to the family of MLCs are the cascaded H-bridge (CHB), the neutral-point-clamped (NPC), the flying capacitor (FC), and the stacked multi-cell (SM) converters. However, to achieve higher number of output voltage levels in above mentioned traditional MLCs, the CHB converters require numerous isolated dc-power supplies, the NPC converters need excessive number of clamping diodes as well as dc-link capacitors, and the FC based converters require extra number of FCs with various voltage levels. In addition, at the higher number of voltage levels, the complexity of control, and modulation methods of traditional MLCs can be substantially increased. Hence, the cost, size, and complexity of the conventional high-resolution MLCs are substantially increased, and the power density and reliability are consequently decreased. Therefore, employing multilevel converters in various industrial applications such as variable frequency drives (VFD) necessitate remarkable amelioration of the MLCs configurations and modulation methods that constitute a big challenge for future industrial development.

Moreover, emerging trends towards bidirectional power flow and regenerative braking capability of VFDs, unity power factor (PF), and sinusoidal input current requires employing active front end (AFE) rectifiers in VFDs and other industrial applications. Three-phase AFE rectifiers have been in continuous development and have emerged as the most powerful and effective way to reduce input current distortions in several industrial applications such as Electric Motor Drives, UPS Battery charging, Power Factor Correction (PFCs) etc. In fact, the voltage source converter (VSC) when operating as an active rectifier features a full control of the DC link voltage and power factor adding to its ability to work in both rectifying and regenerative modes. However, interfacing the utility imposes stringent constraints such as grid current harmonic content below limits stipulated by IEEE Std 512-1992 and unity power factor operation. In VFD applications, a regenerative PWM IGBT-based half-bridge converter have substituted the conventional diode-based rectifier. Even though regenerative rectifiers feature a reduced input harmonics and improved power factor, a suitable passive filter topology can be important to accompany the converter. Mainly, passive L filters were firstly adopted to interconnect the AFE rectifier with the grid, however, with the introduction of IEEE 519-1992 standard, the L filter size and rating becomes very high to reach the harmonics requirements. Consequently, the total cost of the overall AFE rectifier is increased, and its power density is reduced drastically. Even though LC filter can be a substitution, the filter remains bulky and costly since the size of the filter inductor remains unchanged. To mitigate this problem, attempts in literature adopted the design of LCL filters. In fact, when compared to other conventional L and LC filters, LCL filters are less bulky. Although the introduced LCL filter configuration shows good performance, stability and higher harmonic attenuation, the need of an optimized design employing a low cost and smaller passive filter with a reliable MLC-PWM method remains a challenge in the AFE rectifier applications.

The combination of the steep dv/dt of the inverter output voltage with the long cable leads in overvoltage at the motor side. Conventional electric motor drives adopt LC filter as a DM (differential mode) filter, CM filter components, and required damping configurations (passive and active) for improving the input signal waveform given to the motor. When WBG switching devices are used in motor drives applications, value of dv/dt is increased due to high switching speeds of WBG based devices. Whereas, operating at high switching frequency affects directly the filter size reduction and makes the implementation of a filter directly within the system possible. For these reasons, the design of a WBG based VFDs with a suitable filter topology that ensure a good performance of the motor-to-wiring system without affecting the motor lifetime is requested. However, operating with LC filter requires a tradeoff between the output voltage dynamics (namely the ability to dynamically increase/decrease the output voltage—the slew rate) and the attenuation of high frequency output voltage harmonics required for the conducted EMI requirement). It has been demonstrated that increasing the number of filter stages ensures sufficient attenuation at high frequency, in addition to the increase in the current control bandwidth when applied to WBG based VFDs.

While reference is made in the detailed examples to motor controllers and VFDs, it will be appreciated that the power converter apparatus can be applied to inverters for photovoltaic systems, converters for wind power systems, and other applications where there is a demand for efficient, power-dense and lightweight power conversion, such as uninterruptible power supply (UPS) systems, battery chargers and ground power units (GPU) for aircrafts.

Accordingly, employing back-to-back configurations of high switching frequency hybrid MLCs comprising WBG devices with integrated high order passive filters at input and output can be considered among most promising solutions to solve above mentioned issues in VFDs. In this disclosure, a pure sine bidirectional hybrid WBG based five-level converter with integrated double stage filter is proposed for VFD applications to solve the aforementioned problems. The proposed bidirectional back-to-back converter can be comprised of back-to-back hybrid WBG based five-level active-neutral-point-clamped (ANPC) converter. First, a novel single carrier sensor-less modulation method is proposed for the five-level AFE rectifier and motor drive to improve harmonic spectrum of the five-level ANPC converter voltage and to provide sensor-less voltage balancing of the dc-link and flying capacitors. By applying the proposed single carrier modulation method, the first switching harmonic cluster of the output voltage is doubled and odd multiples of the switching harmonic clusters are canceled out. Moreover, the flying capacitor (FC) is charged and discharged with switching frequency which leads to significant reduction of the FC value and size. In addition, an integrated double-stage LC filter is employed in the back-to-back 5L-ANPC topology at both the grid and load sides. A novel design procedure is proposed to optimize the double-stage LC filter size and increase the FC charging speed during the converter start-up. Therefore, combining both advantages of operating at high switching frequency with the GaN devices and of PWM technique that generates first harmonic spectrum at twice the switching frequency, an integrated double-stage filter is obtained. The proposed design presents several features at both AFE and motor side where the filter can be integrated with the overall topology which lead to a reduced size, increased power density when compared to conventional structure.

To overcome the above-mentioned issues, the present disclosure provides a pure sine bidirectional integrated hybrid WBG based five-level converter is proposed for VFD application.

Figure 2:
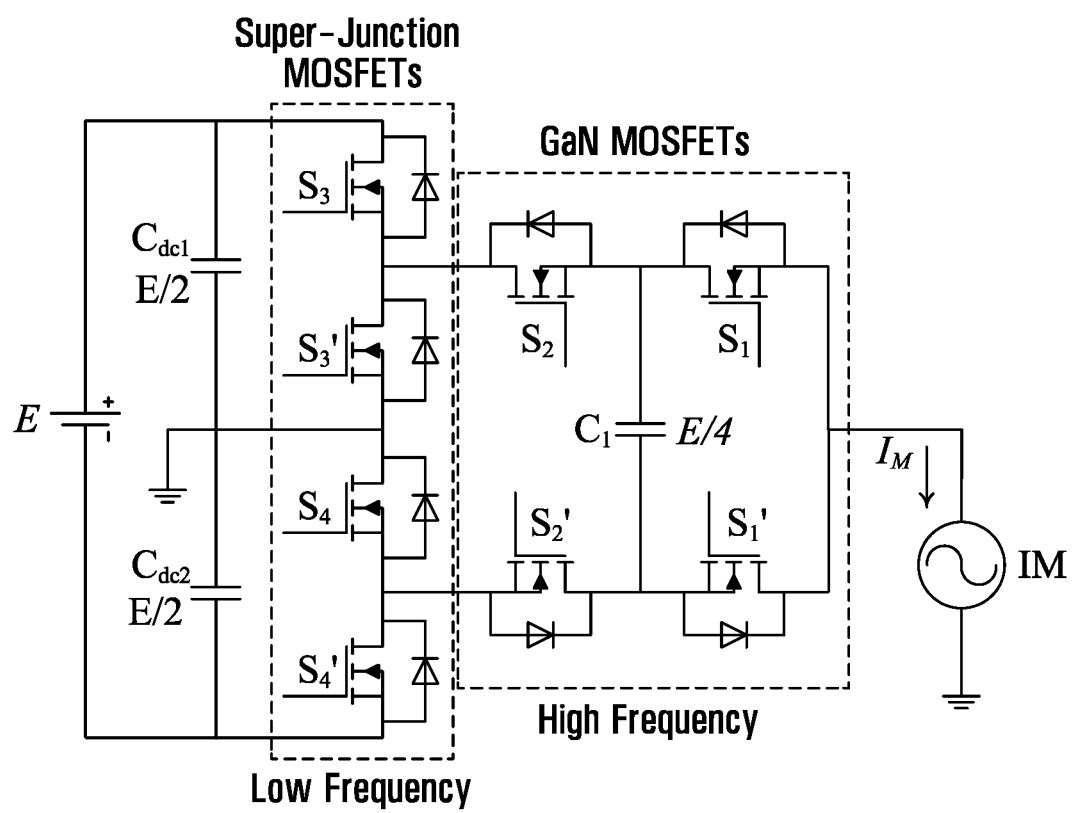
FIG. 2 is a schematic illustration of a five-level ANPC converter.

The overall system configuration illustrated in FIG. 1, is based on a bidirectional hybrid WBG based back-to-back five-level (ANPC)-double stage LC filter topology proposed for three-phase AC drive systems. The five-level ANPC converter, which is a hybrid topology comprising one 3L ANPC leg and one FC cell is widely used in various industrial applications such as medium-voltage industrial drives, static ground power units (GPU) for aircraft, and renewable energy conversion systems. The ANPC topology and its generalized configuration have been presented and described in [P. Barbosa, P. Steimer, L. Meysenc, M. Winkelnkemper, J. Steinke, and N. Celanovic, "Active Neutral-Point-Clamped Multilevel Converters," in 2005 IEEE 36th Power Electronics Specialists Conference, 2005, pp. 2296-2301] and [S. Busquets-Monge and J. Nicolas-Apruzzese, "A Multilevel Active-Clamped Converter Topology—Operating Principle," IEEE Transactions on Industrial Electronics, vol. 58, pp. 3868-3878, 2011.]. As shown in FIG. 2, it can be comprised of eight power switches, two dc-link capacitors, and one flying capacitor (FC). Four of the power switches commutate at low frequency (LF) and the other four power switches operate at high frequency (HF). Hence, the five-level ANPC can be considered as two main cells including the high-voltage with low frequency and the low-voltage with switching frequency (high frequency) cells. By exploiting this feature of the five-level ANPC converter, to increase power density of the proposed bidirectional integrated hybrid converter, a hybrid WBG based configuration of the five-level ANPC converter is proposed. In the hybrid WBG based configuration of the five-level ANPC, silicon (Si) based super junction MOSFET devices are employed in the high-voltage low-frequency cell because of very low on-state resistance and conduction losses, and Gallium Nitride (GaN) WBG devices are used in the low-voltage high-frequency cell because of very low switching losses. Accordingly, not only the high power density hybrid WBG based converter is achieved, but also dv/dt is remarkably reduced in the attained hybrid WBG based bidirectional converter. GaN power devices are high-electron-mobility-transistors (HEMT) which are able to commutate at very high switching frequencies because of their high electron mobility capability and low switching losses. However, GaN power devices are commonly operate at lower voltages because of their structure. Maximum operating voltage of the available commercial GaN devices can be 650V. Therefore, to make it feasible to utilize GaN devices in the pure sine bidirectional hybrid converter for VFDs, the five-level ANPC multilevel converter can be employed to decrease the voltage across the GaN devices. As shown in FIG. 2, the high frequency cell of the five-level ANPC converter operates at E14 which enables use of GaN devices in the high frequency cell. Hence, even though the high frequency cell operates at high switching frequency which can be 100 kHz, the switching losses are low because of the use of GaN MOSFETs. On the other hand, employing Si based super-junction MOSFETs in high-voltage part of the hybrid 5L-ANPC converter not only leads to reduction of cost per kW, but also results in reduction of dv/dt of the proposed hybrid back-to-back converter.

A double-stage LC filter with parallel passive damping is proposed to interface the hybrid five-level ANPC converter at both the utility and drive sides. Operating at high switching frequency offers the possibility of filter size reduction which makes the filter integration within the topology possible. The proposed filter structure is designed to ensure the grid connectivity requirements at the AC mains, while at the motor side it is designed as a dv/dt filter. In addition, the filter design aims to reach the EMI/EMC standards.

Figure 3:
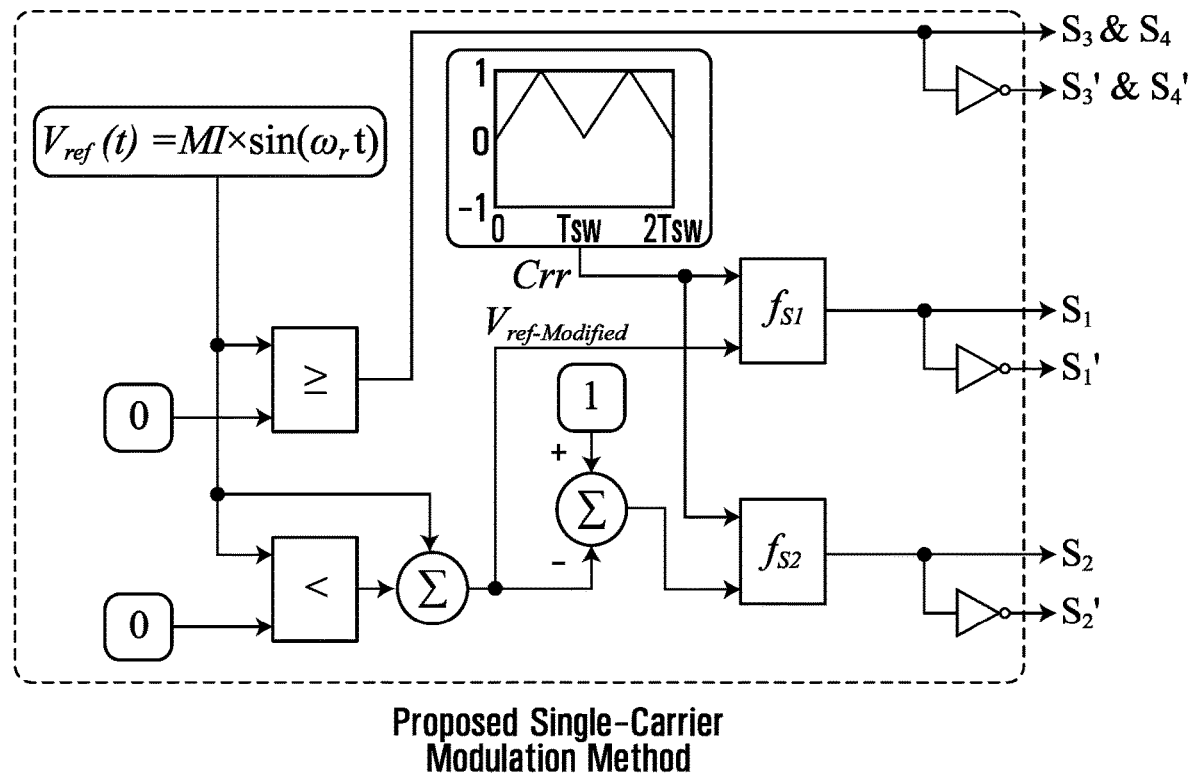
FIG. 3 is a schematic illustration of an example of a single-carrier sensor-less five-level PWM for the 5L ANPC converter.

As shown in FIG. 3, the suggested single-carrier sensor-less modulation method only requires one PWM carrier signal. Also, only two zero-crossing detectors and two defined logic functions are needed to provide switching signals of power switches. Moreover, by employing the proposed sensor-less switching method, the FC is equally charged and discharged in each PWM period which causes sensor-less voltage balancing of FC in the 5L ANPC converter. In addition, since $S_3$ and $S_4$ are equal and generated by zero-crossing comparator, the voltages of dc link capacitors are also balanced to desired values. Furthermore, the odd multiples of switching harmonic cluster frequency are canceled out, and then the frequency of first switching harmonic cluster is doubled by applying the proposed modulation method. Hence, the values of output LC filter inductor and capacitor are halved.

In the proposed modulation method, $S_3$ and $S_4$ switching signals are generated by employing the zero-crossing comparator ($Z_C$). Hence, ($S_3,S_3'$) and ($S_4,S_4'$) commutate at fundamental frequency. Thus, $Z_C$, ($S_3,S_3'$), and ($S_4,S_4'$) are defined as $$Z_C = \begin{cases} 1, & V_{ref} \geq 0 \\ 0, & V_{ref} < 0 \end{cases} \quad (1)$$

$$S_3 = S_4 = Z_C \quad (2)$$

The modified reference voltage ($V_{ref-Modified}$) is defined to provide ($S_1,S_1'$) and ($S_2,S_2'$) by using only one PWM carrier signal. Hence, $V_{ref-Modified}$ is defined as $$V_{ref-Modified} = \begin{cases} V_{ref}, & V_{ref} \geq 0 \\ 1 + V_{ref}, & V_{ref} < 0 \end{cases} \quad (3)$$

$V_{ref-Modified}$, PWM carrier signal (Crr), as well as $f_{S1}$ and $f_{S2}$ logic functions are used to provide ($S_1,S_1'$) and ($S_2,S_2'$) switching signals. $f_{S1}$ and $f_{S2}$ logic functions are defined as $$f_{S1} = \begin{cases} 1, & V_{ref-Modified} \geq Crr \\ 0, & V_{ref-Modified} < Crr \end{cases} \quad (4)$$

$$f_{S2} = \begin{cases} 1, & 1 - V_{ref-Modified} \leq Crr \\ 0, & 1 - V_{ref-Modified} < Crr \end{cases} \quad (5)$$

$$S_1 = f_{S1} \quad (6)$$

$$S_2 = f_{S2} \quad (7)$$

Figure 4:
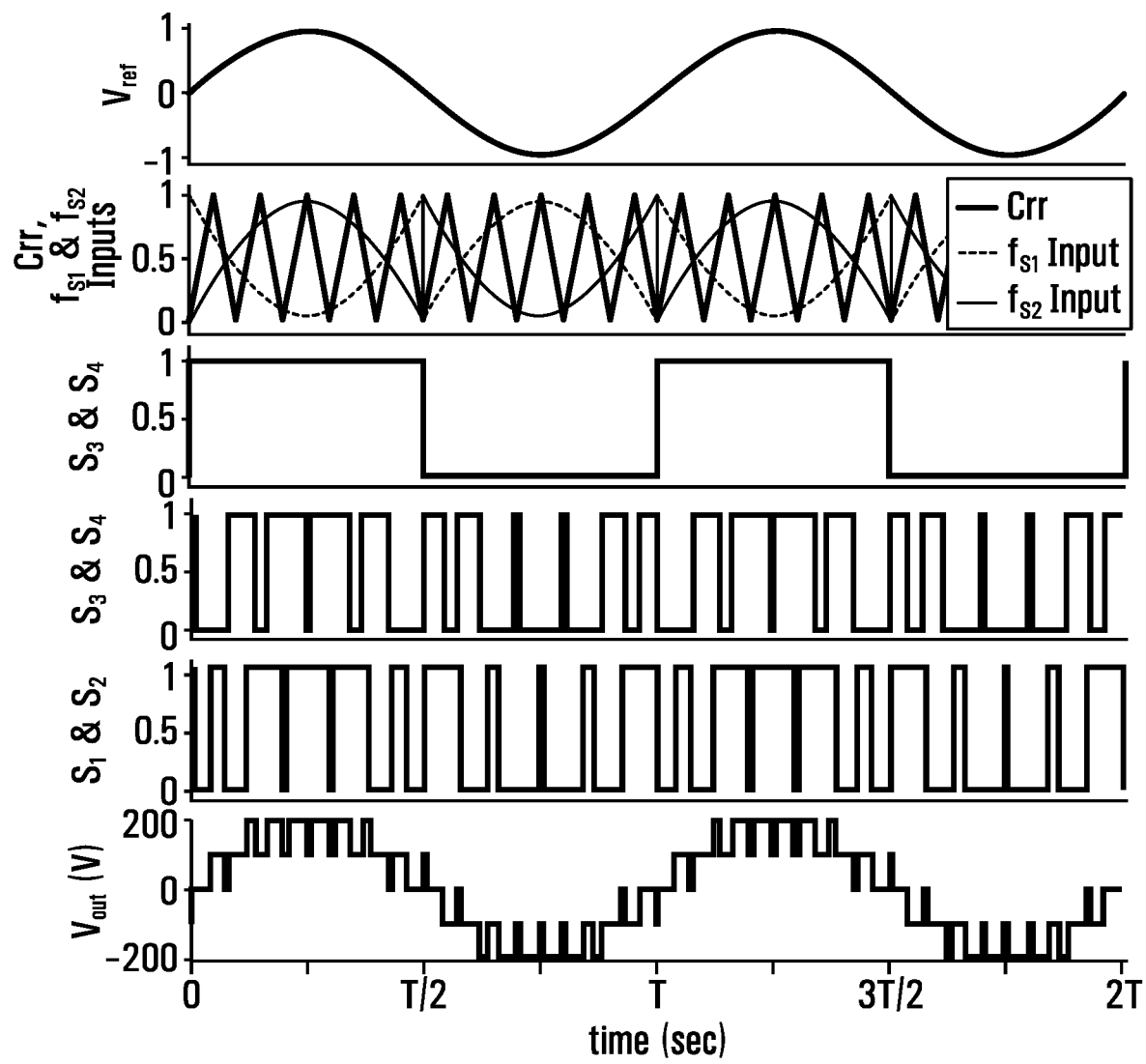
FIG. 4 is a schematic illustration of the switching pattern of the proposed modulation method, and inputs, carrier signal, switching signals, and output voltage. in accordance with one embodiment of the present disclosure.

The switching pattern of the proposed single-carrier sensor-less modulation method, $f_{S1}$ and $f_{S2}$ inputs, carrier signal, switching signals, and output voltage is depicted in FIG. 4.

As shown in FIG. 4, ($S_3$,$S_3'$), and ($S_4$,$S_4'$) commutate at fundamental frequency. Moreover, $f_{S1}$ and $f_{S2}$ logic functions inputs are $V_{ref\text{-}Modified}$ and ($1-V_{ref\text{-}Modified}$), respectively. Hence, $f_{S1}$ and $f_{S2}$ inputs are compared to Crr carrier signal to generate ($S_1$,$S_1'$) and ($S_2$,$S_2'$) switching signals, respectively. The charging and discharging of FC are balanced in each PWM period, and sensor-less voltage balancing of FC is achieved by using the proposed switching method. Furthermore, the frequency of first switching harmonic cluster is doubled which causes halving the values of output LC filter inductor and capacitor.

As presented in FIG. 3, two new defined pseudo functions are used to generate corresponding switching signals of (S1,S1') and (S2,S2') power switches. Therefore, Fourier series expansion of $s_2$ and $s_1$ HF switching function are expressed as $$f_{Pseudo-ref-2}(t) = s_2(t) = \frac{1}{2}A_{00} + \sum_{n=1}^{\infty}\{A_{0n}\cos(n\omega_r t) + B_{0n}\sin(n\omega_r t)\} + \qquad (8)$$

$$\sum_{m=1}^{\infty}\{A_{m0}\cos(m\omega_s t) + B_{m0}\sin(m\omega_s t)\} +$$

$$\sum_{m=1}^{\infty}\sum_{n=\pm 1}^{\pm\infty}\{A_{mn}\cos(m\omega_s t + n\omega_r t) + B_{mn}\sin(m\omega_s t + n\omega_r t)\}$$

$$A_{mn-s2} = \frac{1}{2\pi^2}\int_{-\pi}^{\pi}\int_{-\pi}^{\pi}f_{Pseudo-ref-2}(x, y)\cos(mx + ny)dxdy \qquad (9)$$

$$x = m\omega_s t, \ y = n\omega_r t$$

$$f_{Pseudo-ref-1}(t) = s_1(t) = \frac{1}{2}A_{00} + \sum_{n=1}^{\infty}\{A_{0n}\cos(n\omega_r t) + B_{0n}\sin(n\omega_r t)\} + \qquad (10)$$

$$\sum_{m=1}^{\infty}\{A_{m0}\cos(m\omega_s t) + B_{m0}\sin(m\omega_s t)\} +$$

$$\sum_{m=1}^{\infty}\sum_{n=\pm 1}^{\pm\infty}\{A_{mn}\cos(m\omega_s t + n\omega_r t) + B_{mn}\sin(m\omega_s t + n\omega_r t)\}$$

$$A_{mn-s1} = \frac{1}{2\pi^2}\int_{-\pi}^{\pi}\int_{-\pi}^{\pi}f_{Pseudo-ref-1}(x, y)\cos(mx + ny)dxdy \qquad (11)$$

$$x = m\omega_s t, \ y = n\omega_r t$$

In (8) and (10), the first term represents the dc offset, the second term represents fundamental component and baseband harmonics, the third term represents the carrier harmonics, and the fourth term represents the sideband harmonics of the modulated reference signal.

Moreover, to frequency domain analysis of the proposed single-carrier sensor-less PWM method of the 5L ANPC converter, a decoupled mathematical model of the 5L ANPC converter by exploiting equivalent two-port switching circuit theory is defined as follows.

First, the depicted 5L ANPC converter in FIG. 2 can be presented as two decoupled parts including low frequency Si based voltage doubler and high frequency GaN based 3L dc-dc cell.

$$s_i = \begin{cases} 1, & \text{if } S1 \text{ or } S2 \text{ is } ON \\ -1, & \text{if } S1' \text{ or } S2' \text{ is } ON \end{cases} \text{ for } i = 1, 2 \qquad (12)$$

Figure 5:
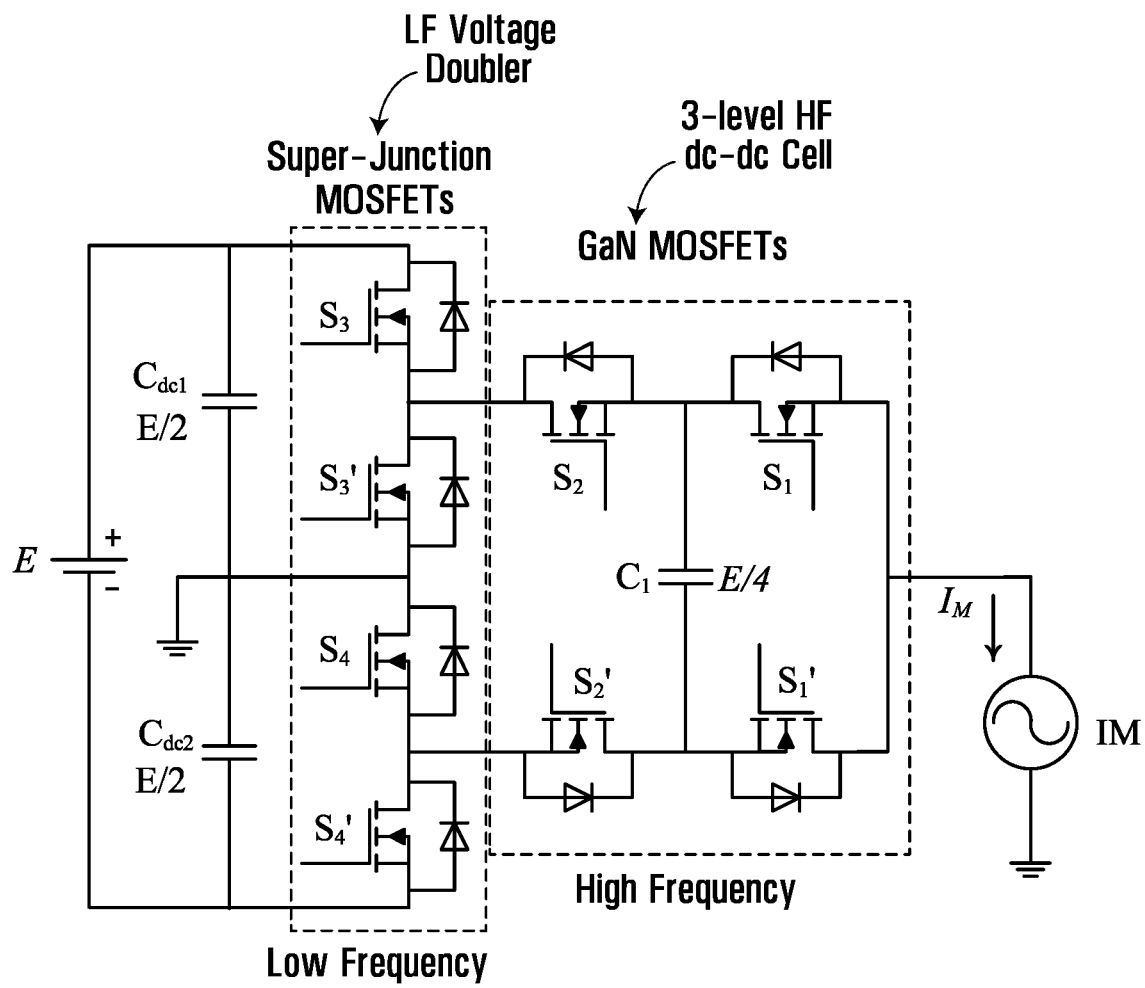
FIG. 5 is a schematic illustration of decoupled parts of the 5L ANPC converter configuration in accordance with one embodiment of the present disclosure.

Considering FIG. 5, the output voltage of the 3-level HF dc-dc cell ($V_{HF\text{-}cell}$) of the 5L ANPC converter is defined as:

$$v_{HF-cell} = \left|\frac{E}{2}\cdot s_2 + \frac{1}{2}v_c\cdot\{s_1 - s_2\}\right| \qquad (13)$$

With regard to (13), the 3-level GaN based HF dc-dc cell provides 0, E/4, E/2 voltage levels at its output and the presented Si based LF voltage doubler circuit converts the provided 3-level dc voltage by the HF dc-dc cell to the 5-level ac voltage at the output of the 5L ANPC converter.

Hence, the voltage difference between the actual value of the capacitor voltage ($v_C$) and the desired value of the capacitor voltage (E/4) is defined as:

$$v_d = \frac{E}{4} - v_c \qquad (14)$$

where $v_d$ is the voltage difference between the desired and actual values of the capacitor voltage. Then, corresponding difference switching function ($s_d$) to $v_d$ also is defined to represent the relevant switching function to the capacitor voltage unbalance.

$$s_d = \frac{1}{2}\{s_2 - s_1\} \qquad (15)$$

Moreover, the corresponding total switching function ($s_t$) is expressed as:

$$s_t = \frac{1}{2}\{s_2 + s_1\} \qquad (16)$$

Figure 6:
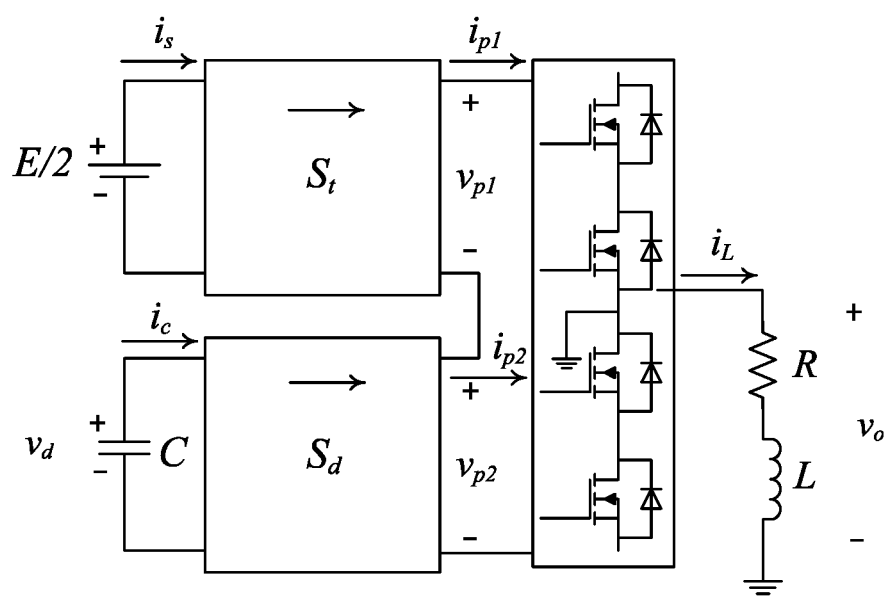
FIG. 6 is a schematic illustration of an equivalent decoupled circuit of the 5L ANPC converter by using d and t parameters in accordance with one embodiment of the present disclosure.

Hence, the equivalent decoupled circuit of the 5L ANPC converter by using d and t parameters is presented in FIG. 6.

With regard to (8) to (11), and (16), $s_t$ which represents the output voltage harmonic spectrum, contains fundamental frequency content and harmonic clusters at around $2kf_{SW}$, k=1, 2, . . . . Hence, the first switching harmonic cluster of the output voltage is shifted to twice of switching frequency and odd multiples of switching harmonic clusters are canceled out from the output voltage.

With regard to (8) to (11), and (15), $s_d$ which represents charging/discharging frequency of the FC, has harmonic clusters at around $(2k-1)f_{SW}$, k=1, 2, . . . . Hence, the first harmonic cluster of charging/discharging of the FC is around switching frequency and the fundamental frequency content and even multiples of switching harmonic clusters are canceled out from $s_d$. Hence, the FC is charged and discharged with switching frequency and is decoupled from harmonic spectrum of the $s_t$.

As presented in FIG. 6, the proposed switching pattern for the 5L ANPC converter is decoupled to $S_t$ and $S_d$ two-port switching circuits. Based on the two-port switching circuit theory, the relation between input and output of the presented two-port switching circuits $S_t$ and $S_d$ in frequency domain are expressed as:

$$\begin{cases} V_{p1}(\omega) = S_t(\omega)\star E(\omega)/2 \\ I_s(\omega) = S_t(\omega)\star I_{p1}(\omega) \end{cases} \qquad (17)$$

-continued $$\begin{cases} V_{p2}(\omega) = S_d(\omega) \star V_d(\omega) \\ I_C(\omega) = S_d(\omega) \star I_{p2}(\omega) \end{cases} \quad (18)$$

where * is the convolution operator in the frequency domain. With regard to the fact that E(t) and $v_d$(t) are dc values in the steady state condition, they are constant values.

As presented in FIG. 6, the load current in frequency domain is determined as:

$$I_L(\omega) = \frac{V_O(\omega)}{Z(\omega)} = \frac{V_{p1}(\omega) + V_{p2}(\omega)}{Z(\omega)} \quad (19)$$

By substituting (17) and (18) in (19), $$I_L(\omega) = \frac{V_{p1}(\omega) + V_{p2}(\omega)}{Z(\omega)} = \frac{E/2 \cdot S_t(\omega) + V_d \cdot S_d(\omega)}{Z(\omega)} \quad (20)$$

Moreover, as depicted in FIG. 6, the capacitor current in frequency domain is expressed as:

$$I_C(\omega) = -I_L(\omega) \star S_d(\omega) = -\left(\frac{E/2 \cdot S_t(\omega) + V_d \cdot S_d(\omega)}{Z(\omega)}\right) \star S_d(\omega) \quad (21)$$

Therefore, (21) is solved for steady state condition in which $\omega=0$. In order to prove self-balancing of the capacitor voltage to its desired value, the capacitor current in steady state condition should be zero, then (21) is solved for $I_C(\omega)_{\omega=0}=0$.

$$\frac{V_d}{E} = \frac{\text{Re}\left\{\int_0^\infty S_t(\xi) Z(\xi) \overline{S_d(\xi)} d\xi\right\}}{2 \text{Re}\left\{\int_0^\infty \frac{|S_d(\xi)|^2}{Z(\xi)} d\xi\right\}} \quad (22)$$

Eq. (22) presents the capacitor voltage unbalance of the 5L ANPC converter controlled by the proposed single-carrier sensor-less modulation method. In order to minimize the capacitor voltage unbalance, (22) should be minimized. Hence, the numerator of (22) should be zero to guarantee self-balancing of the capacitor voltage. the numerator of (22) will be zero if $$|S_t(\omega)||S_d(\omega)| \approx 0 \quad (23)$$

$Z(\xi)$ has "Real" value

Eq. (23) is satisfied if the switching frequency is high enough in comparison to the fundamental frequency and the integrated double-stage filter has real value (resistive value) at switching frequency.

Therefore, with regard to (22) and (23), the 5L ANPC converter capacitor voltage self-balancing is proved and obtained in steady-state condition by employing the proposed single-carrier sensor-less modulation method with defined pseudo functions.

Similarly, due to the fact that the charging and discharging of the 5L ANPC converter capacitor is balanced in each switching period by implementing the proposed single-carrier sensor-less modulation method, the voltage balancing of the capacitor during converter start-up is faster than that by applying the traditional method in which the capacitor is charged and discharged in each output voltage fundamental period.

Figure 7:
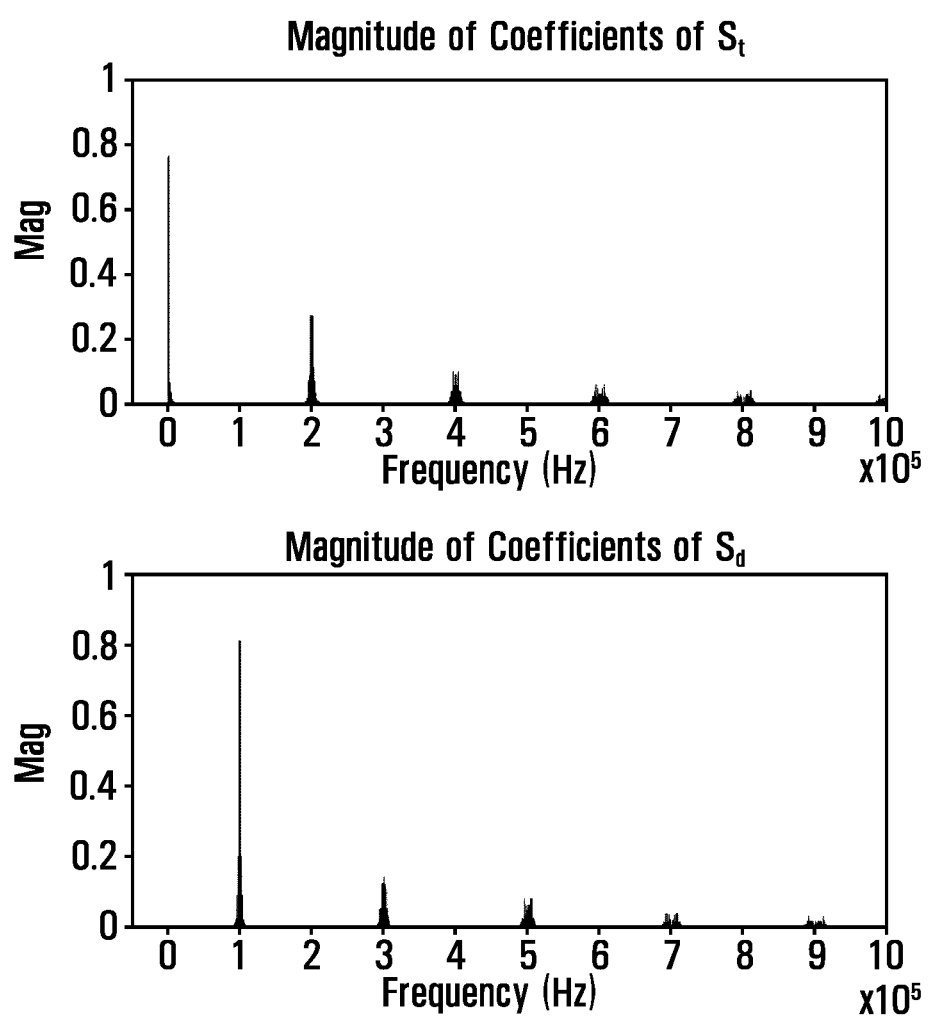
FIG. 7 illustrates Harmonics of $s_t$ and $s_d$ total and difference switching functions for $f_{SW}$=100 kHz and M=0.9 in accordance with one embodiment of the present disclosure.

In addition, with regard to FIGS. 6 and (15) and (16), the total switching function ($s_t$) and difference switching function ($s_d$) are defined for equivalent decoupled circuit of the 5L ANPC converter by using d and t parameters. It is worth mentioning that the difference switching function ($s_d$) represents the voltage balancing of the capacitor and the total switching function ($s_t$) represents the output voltage harmonic spectrum. Considering (15) and (16), harmonics of $s_t$ and $s_d$ total and difference switching functions for $f_{SW}=100$ kHz and M=0.9 are shown in FIG. 7. As presented in FIG. 7, the total switching function (se), which presents the output voltage harmonic spectrum, has harmonic clusters at $2k \cdot f_{SW}$ where k is an integer number. Hence, odd multiples of the switching harmonic clusters are canceled out at the output voltage frequency spectrum and the first switching harmonic cluster of the output voltage is shifted to $2f_{SW}$. Therefore, the amended output voltage spectrum is obtained by applying the proposed single-carrier sensor-less modulation method. In addition, as shown in FIG. 7, the difference switching function ($s_d$), which presents charging/discharging of the capacitor, has the switching harmonic clusters at $(2k-1) \cdot f_{SW}$, k=1, 2, . . . . Hence, the 5L ANPC converter capacitor is charged and discharged by switching frequency and the even multiples of the switching harmonic clusters are canceled out at the difference switching function ($s_d$). Hence, the total switching function (se) and difference switching function ($s_d$) are completely decoupled and considering (23) the sensor-less capacitor voltage balancing is also obtained by applying the proposed single-carrier sensor-less modulation method.

Two-Stage LC Filter with Parallel RC Damping Design Method

Figure 8:
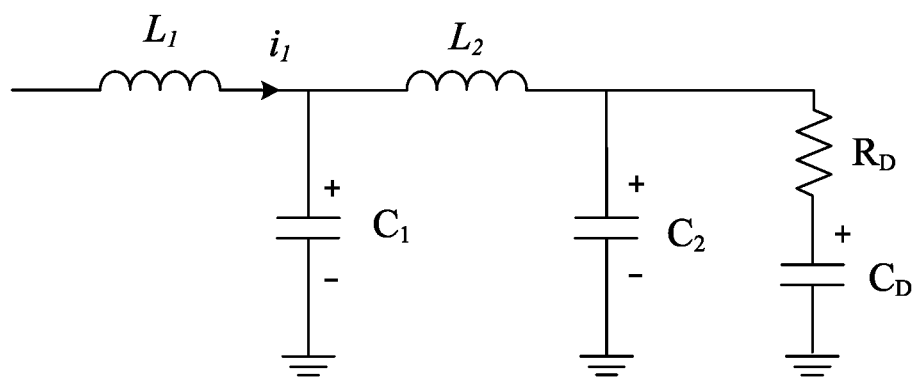
FIG. 8 is a schematic illustration of a double Stage LC filter with RC damping in accordance with one embodiment of the present disclosure.

A detailed design of a passive filter that can be integrated at both the utility and load side is presented. A two-stage LC pass filter with parallel RC damping at the next stage can be the chosen configuration as its depicted in FIG. 8. The choice of this configuration features a sufficient switching noise attenuation and guarantees high current control bandwidth. Moreover, when referenced to the DC midpoint of the 5L-ANPC converter, a common DM and CM noise attenuation is obtained. Parallel RC damping in the second stage can be chosen in order to overcome the resonance problem with low losses.

In a way to achieve a high power density of the overall system, an optimum filter design is desired. A combined critical damping-adaptive design method can be introduced to achieve both good filter response with a fast DC voltage balancing of the converter. The design method of the filter parameters can be divided in two steps. First, the passive filter parameters are calculated based on a critical damping optimizing method and after an accurate adaptive design can be applied to ensure the faster flying capacitors charging of the ANPC converter. Thus, as disclosed herein, a particular PWM modulation technique can be applied to the ANPC converter allowing the balancing of the DC link capacitors voltages without the need of a balancing controller. This can be achieved by (23).

The transfer function of the filter depicted in FIG. 1 can be written as follows:

$$G(s) = \frac{k_1 s + 1}{k_5 s^5 + k_4 s^4 + k_3 s^3 + k_2 s^2 + k_1 s + 1} \quad (24a)$$

where, $$k_1 = R_D C_D \quad (24b)$$

$$k_2 = L_1(C_1 + C_2 + C_D) + L_2(C_2 + C_D) \quad (24c)$$

$$k_3 = R_D C_D (L_1 C_1 + L_2 C_2 + L_1 C_2) \quad (24d)$$

$$k_4 = L_1 L_2 C_1 (C_2 + C_D) \quad (24e)$$

$$k_5 = L_1 L_2 C_1 C_2 C_D R_D \quad (24f)$$

The fifth-order denominator part of the transfer function G(s) can be normalized and written as in (25) where $\omega_0$ represents the cut-off angular frequency.

$$G_1(s) = \frac{1}{\left(1 + a_1 \frac{s}{\omega_0}\right)\left(1 + a_2 \frac{s}{\omega_0} + b_2 \frac{s^2}{\omega_0^2}\right)\left(1 + a_3 \frac{s}{\omega_0} + b_3 \frac{s^2}{\omega_0^2}\right)} \quad (25)$$

Optimizing the transfer function G(s) can be done by critical damping method which requires a proper values for $a_i$ and $b_i$ coefficients as stated in Table I.

TABLE I

| Coefficients for critical damping optimization method | |
|---|---|
| $a_1$ | 0.3856 |
| $a_2$ | 0.7712 |
| $b_2$ | 0.1487 |
| $a_3$ | 0.7712 |
| $b_3$ | 0.1487 |

Thus, by a proper comparison between Eq. (24a) and (25), the proper relationship between $k_i$ with $a_i$ and $b_i$ coefficients can be deduced as in (26):

$$k_1 = \frac{a_1 + a_2 + a_3}{\omega_0} \quad (26a)$$

$$k_2 = \frac{b_3 + a_2 a_3 + b_2 + a_1 a_3 + a_1 a_2}{\omega_0^2} \quad (26b)$$

$$k_3 = \frac{a_2 b_3 + a_3 b_2 + a_1 a_2 a_3 + a_1 b_2}{\omega_0^3} \quad (26c)$$

$$k_4 = \frac{b_2 b_3 + a_1 a_2 b_3 + a_1 a_3 b_2}{\omega_0^4} \quad (26d)$$

$$k_5 = \frac{a_1 b_2 b_3}{\omega_0^5} \quad (26e)$$

The critical damping design method of the filter by setting a desired attenuation $G_B$ at a specific angular frequency $\omega_B$ in the blocking area of the filter ($\omega_B >> \omega_0$). Due to the modulation technique adopted on the 5L-ANPC converter, the first harmonic cluster in the output voltage will appear at twice the switching frequency of the power converter. Thus, the angular frequency (DB is set as in (27) where $f_{sw}$ represents the switching frequency:

$$\omega_B = 2\pi . 2 . f_{sw} \quad (27)$$

After setting the desired attenuation at the desired angular frequency, the cut-off frequency of the filter will be calculated as follows:

$$\omega_0 = \omega_B \sqrt[4]{\frac{G_B a_1 b_2 b_3}{a_1 + a_2 + a_3}} \quad (28)$$

For the filter inductor $L_1$, it is determined to achieve a desired current ripple. In general a coefficient k=10%~25% of the peak value of the output current is allowable. Therefore, the output current ripple can be written as:

$$\Delta I_L = \sqrt{2} k \frac{S_{out}}{V_{out}} \quad (29)$$

where $S_{out}$ and $V_{out}$ are the converter output apparent power and voltage respectively. By taking into consideration the relationship between the PWM duty cycle, the switching frequency $f_{SW}$, the number of levels at the output voltage and the DC-link voltage, the first stage filter inductor $L_1$ is determined as:

$$L_1 = \frac{V_{DC}}{8(n-1)\Delta I_L 2 f_{sw}} \quad (30)$$

The remaining filter parameters with passive damping components are then derived from the filter transfer function as follow:

$$L_2 = \frac{L_1}{\frac{(k_3 k_4 - k_2 k_5)(k_1 k_2 - k_3)}{(k_1 k_4 - k_5)^2} - 1} \quad (31)$$

$$C_2 = \frac{k_5(k_1 k_2 - k_3)}{k_1(k_1 k_4 - k_5)(L_1 + L_2)} \quad (32)$$

$$C_1 = \frac{k_5}{(k_1 L_1 L_2 C_2)} \quad (33)$$

$$R_D = \frac{k_1 k_5}{C_2(k_1 k_4 - k_5)} \quad (34)$$

$$C_D = \frac{k_1}{R_D} \quad (35)$$

However, the critical damping method of the double stage LC filter detailed previously is not sufficient to ensure an efficient performance of the proposed 5L-ANPC+LCLC filter design since the interaction between the grid and the power converter will be delayed. For this reason, to ensure that the 5L-ANPC flying capacitors charging is accomplished and not delayed, the filter impedance seen at the power converter side has to be minimum at the switching frequency. If at this frequency, the double stage LC filter is at its minimum, the flying capacitors will be charged on time, and thus a five level inverter output voltage can be easily accomplished. The double stage LC filter presents one dipping frequency $f_d$ at which the filter output impedance is minimum can be written as follows:

$$f_d = \frac{1}{2\pi\sqrt{C_1 L_S}} \quad (36a)$$

$$L_S = \frac{L_1 L_2}{(L_1 + L_2)} \tag{36b}$$

By ensuring that the dipping frequency of the filter is nearby the switching frequency of the power converter, the response of the ANPC-filter system will be accurate. Since the choice of the inductor $L_1$ is important in the filter design, an adapting method will be applied only on both $C_1$ and $L_2$ parameters to achieve a desired dipping frequency without adding modification on the optimum filter design.

Figure 9:
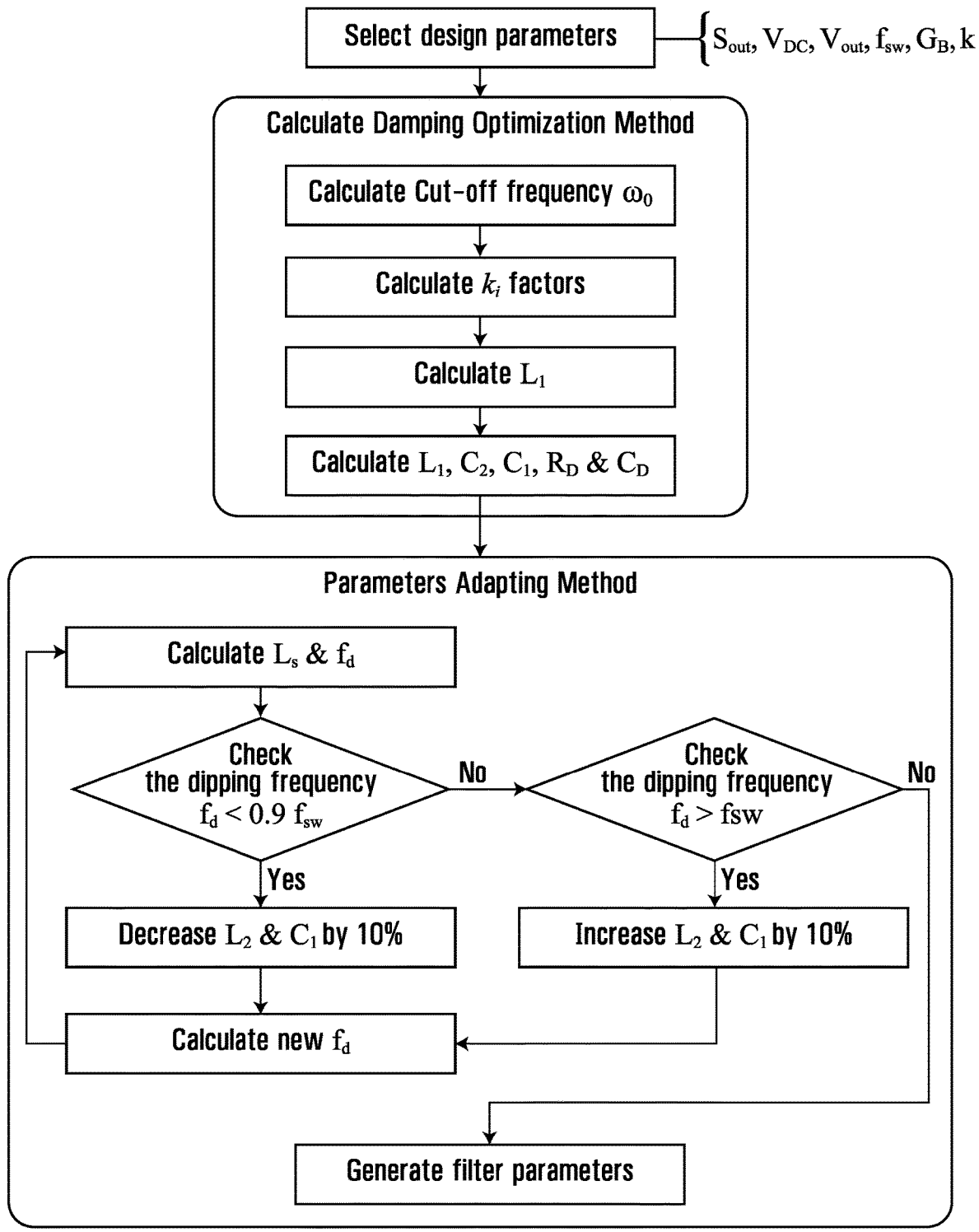
FIG. 9 illustrates an Optimum Filter Design Algorithm in accordance with one embodiment of the present disclosure.

The schematic diagram of an example of the proposed critical damping-adaptive design is depicted in FIG. 9. As it is shown, that the introduced design method starts by selecting the system parameters such as inverter desired output power $S_{out}$, DC link voltage $V_{DC}$, the inverter output voltage $V_{out}$, the switching frequency $f_{SW}$, the desired attenuation $G_B$ and the first stage inductor current ripple factor. The critical damping optimization method can be then applied to generate the optimum filler parameters as per Eq. (28)-(35). The adaptive method will then start by calculating the equivalent inductance $L_S$ and the corresponding dipping frequency $f_d$ as per (36). Then the algorithm will check if the obtained dipping frequency is in the range of 90%-100% of $f_{SW}$. The adaptive method will change accordingly the inductor $L_2$ and $C_1$ until reaching the desired dipping frequency. In the end, the proposed method will generate the proposed filter parameters.

Figure 10:
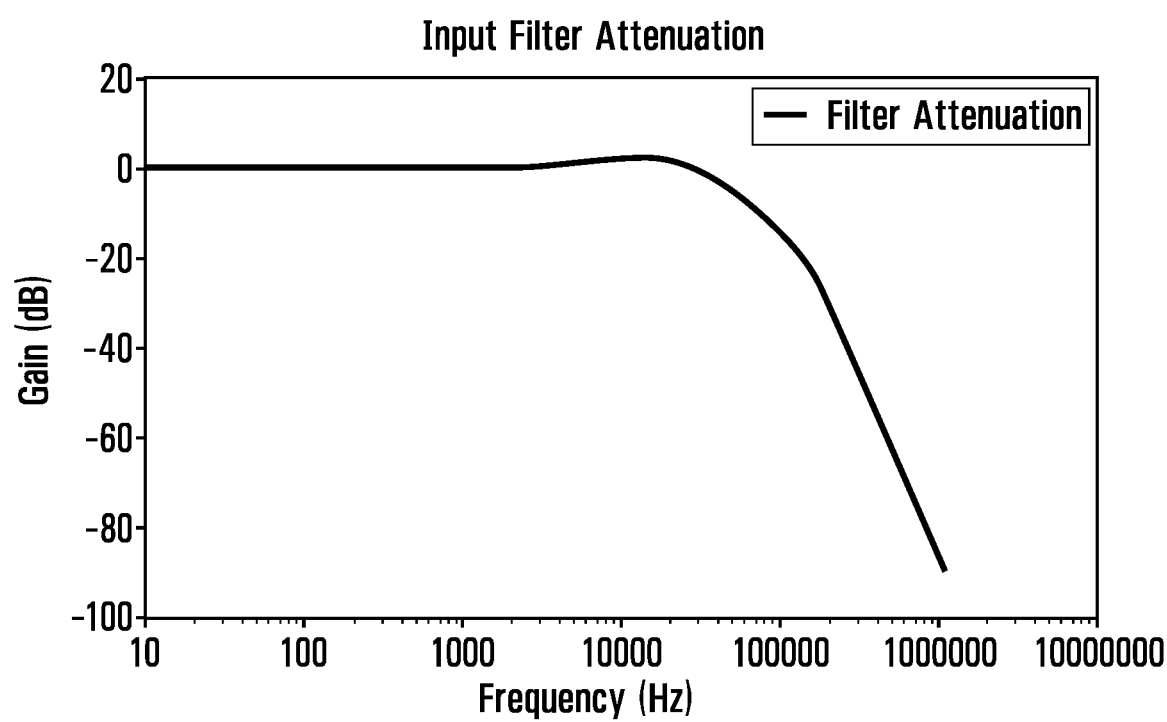
FIG. 10 illustrates a Bode diagram of filter attenuation diagram in accordance with one embodiment of the present disclosure.
Figure 11:
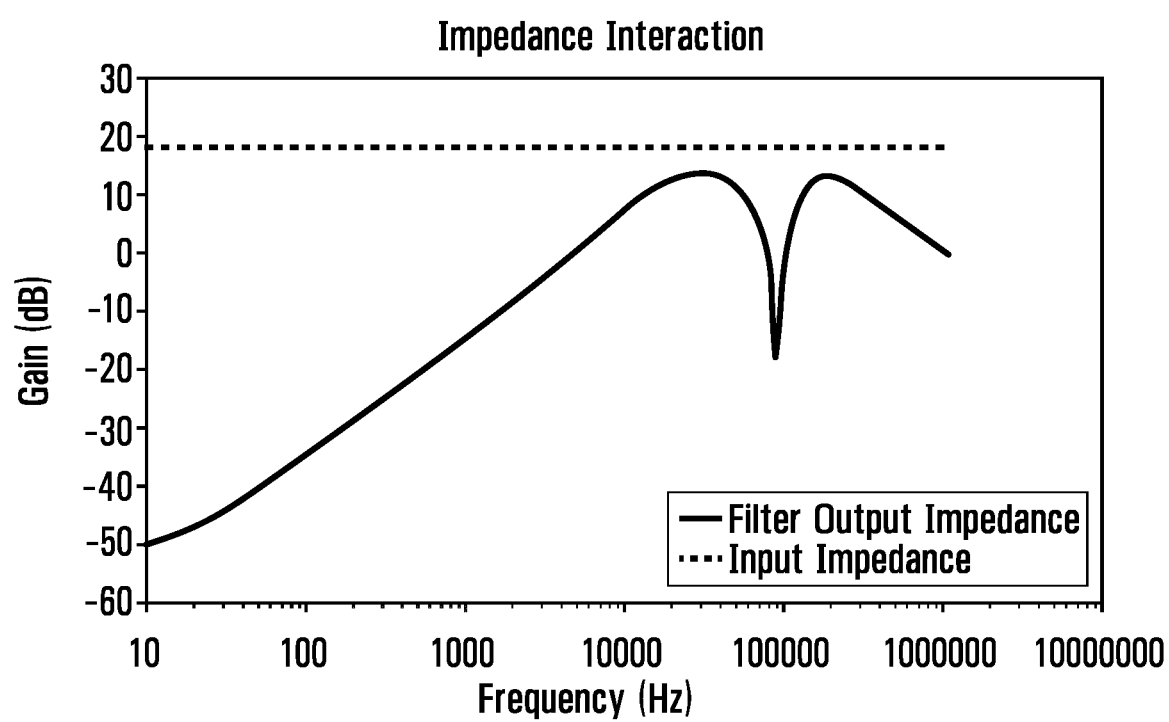
FIG. 11 illustrates Bode diagram of filter impedance diagram in accordance with one embodiment of the present disclosure.
Figure 12:
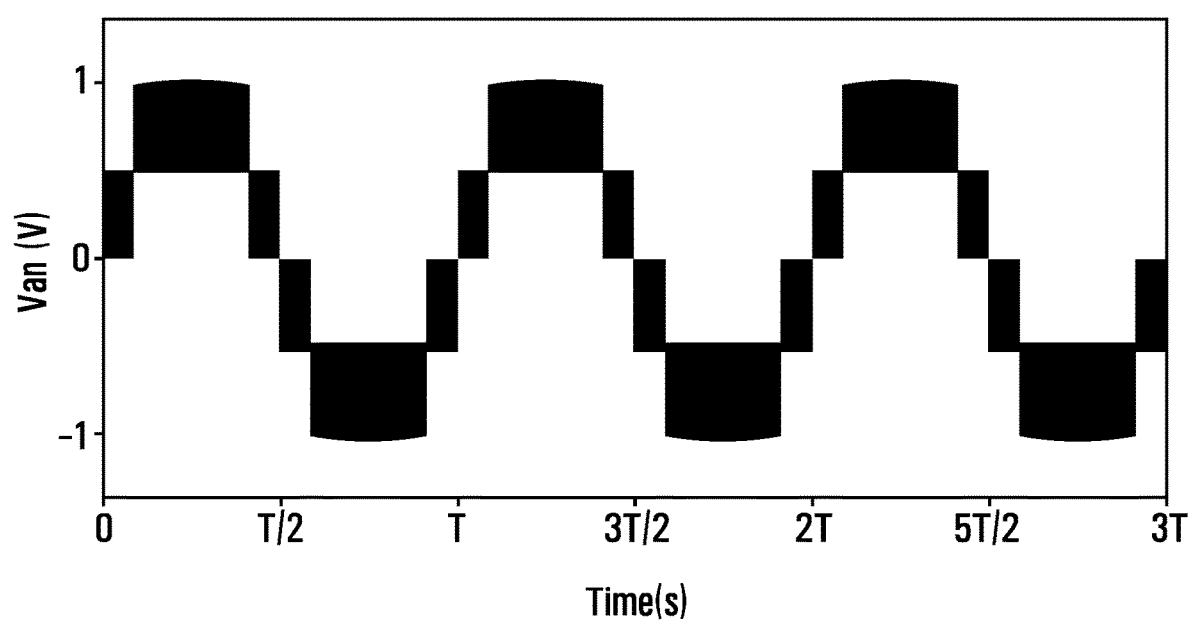
FIG. 12 is a diagram showing a Five-level Inverter Output Voltage before the double-stage filter in accordance with one embodiment of the present disclosure.
Figure 13:
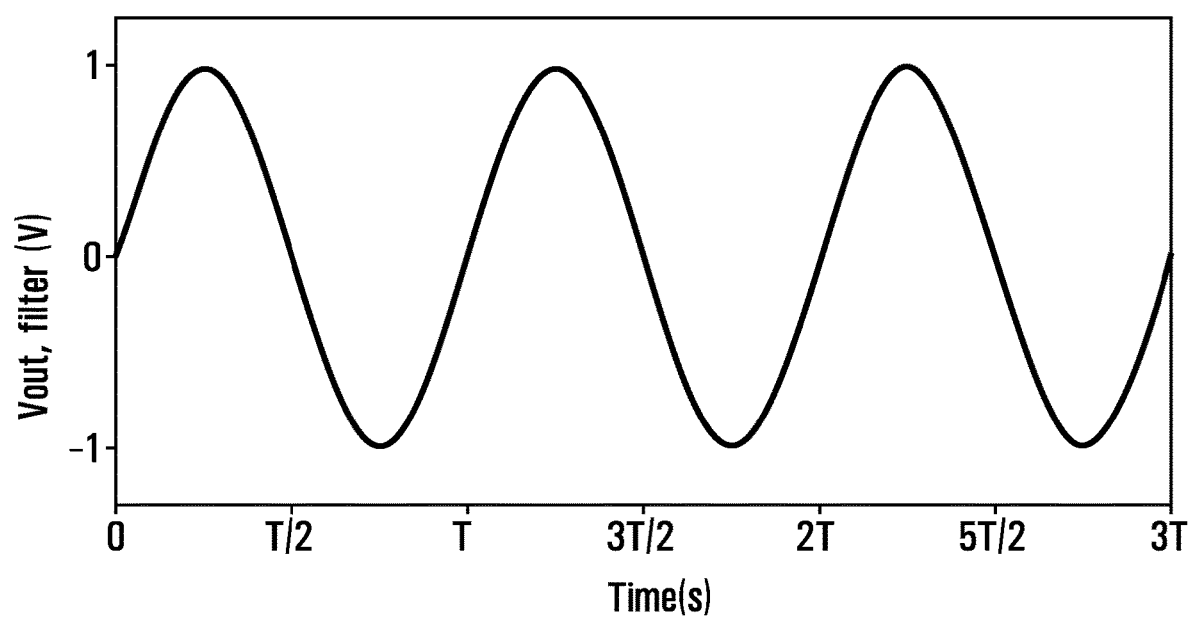
FIG. 13 is a diagram showing the Output Voltage after the double-stage filter in accordance with one embodiment of the present disclosure.

FIG. 10 and FIG. 11 depict the bode diagram for the attenuation and the output impedance of a two-stage LC filter designed by the proposed critical damping-adaptive method. The designed filter is interfacing a hybrid WBG based 5L-ANPC back-to-back topology for long cable AC drive applications. As it is shown in the diagram of FIG. 11, the dipping frequency of the proposed filter can be set at almost the switching frequency of the converter which can be chosen to be equal to 100 kHz in this case. The filter inductors and capacitors as the RC damping parameters are calculated accordingly.

Figure 14:
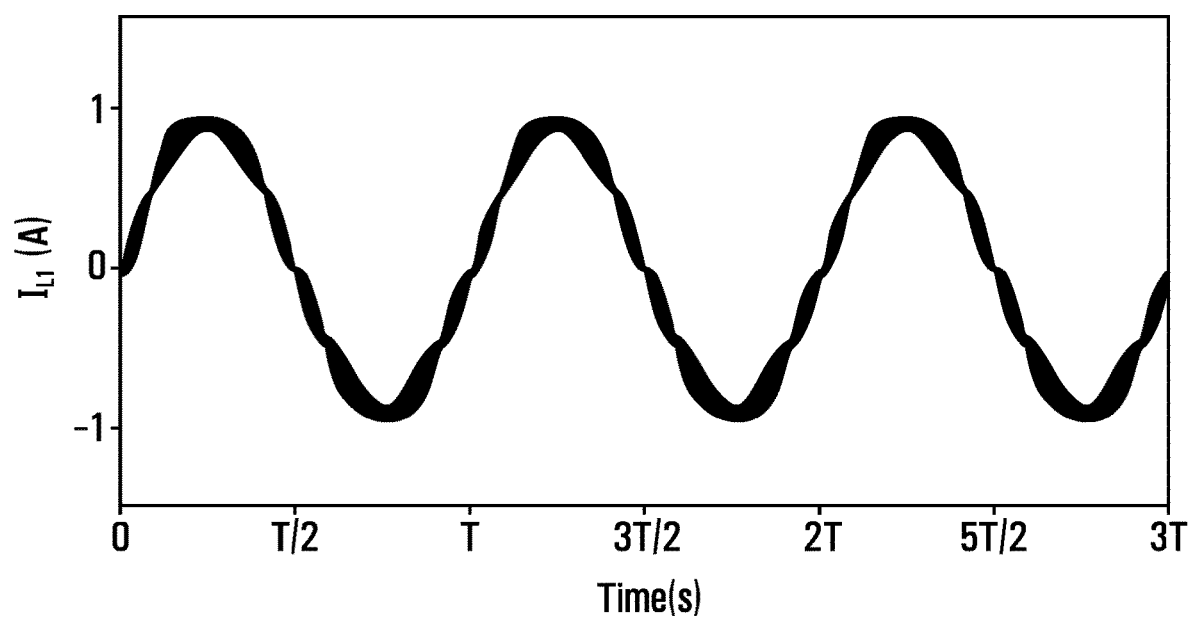
FIG. 14 is a diagram showing current of the first inductor ($L_1$) of the double-stage filter in accordance with one embodiment of the present disclosure.
Figure 15:
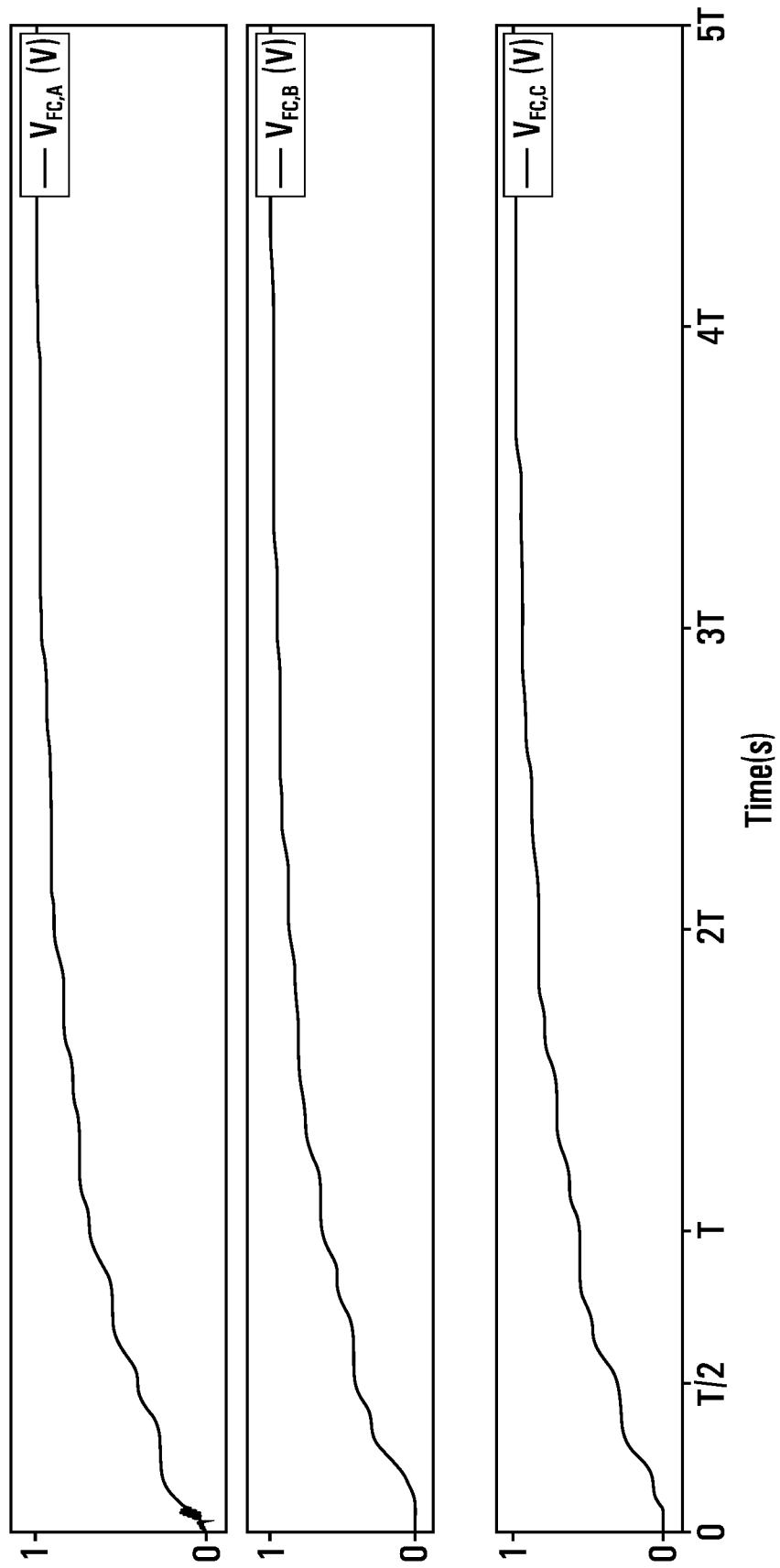
FIG. 15 is a diagram showing three-phase flying capacitors voltages in accordance with one embodiment of the present disclosure.

FIG. 12 to FIG. 16 represent the simulation results obtained when the proposed double-stage LC filter is integrated with the 5L-ANPC back-to-back topology to run a 300-m cable AC drive. It should be noted that the pulse width modulation technique explained previously takes in action of switching the Si and GaN switching devices. It can be seen that the five-level output voltage is very well obtained at the converter side as it is clear in FIG. 12 which verifies the good performance of the proposed carrier-based PWM technique. Moreover, FIG. 13 to FIG. 16 validate the effectiveness of the proposed critical damping-adaptive filter design at the AFE side where a smooth sinusoidal voltage waveform is obtained at the grid-side. In addition, the current waveform depicted in FIG. 14 shows that the current ripples of inductor $L_1$ are in the acceptable range. It should be noted that the current ripple factor is set to 0.15 of the rated current (this fraction can vary). Moreover, due to the adaptive method introduced in the design, the three-phase flying capacitors charging is not delayed as it is confirmed in FIG. 15.

Figure 16:
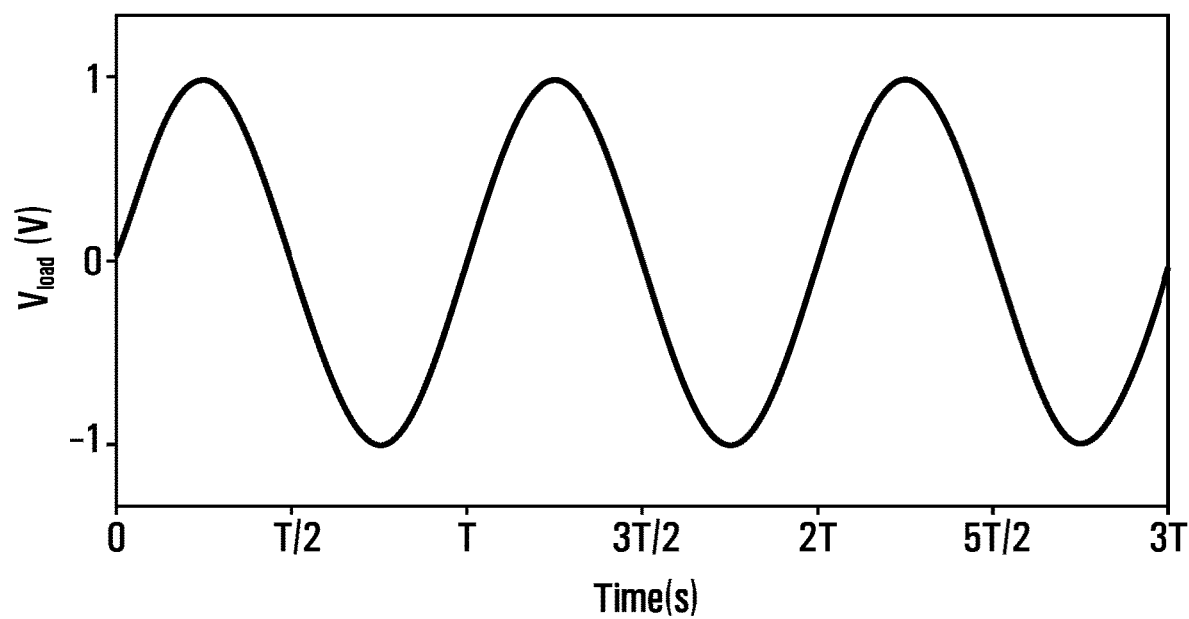
FIG. 16 depicts the phase voltage obtained at the AC motor terminals when a 300-m cable is connected between the 5L-ANPC and the motor.

To test the effectiveness of the proposed filter design for WBG-based VFD applications, a long cable modeling can be introduced to the back-to-back overall topology. It should be noted that the 300-m cable design can be based on [S. Amarir and K. Al-Haddad, "A new design tool to protect industrial long-cable PWM ASD systems against high-frequency overvoltage problems," Canadian Journal of Electrical and Computer Engineering, vol. 33, pp. 125-132, 2008.]. As stated previously that one of the biggest concerns of the WBG-based VFD is the high dv/dt caused by high switching frequency operation of the system. Thus, this will lead to additional overvoltage at the motor terminals, probable motor damage and reduced lifetime. For this reason, the design of the filter is important in this case. FIG. 16 depicts the phase voltage obtained at the AC motor terminals when a 300-m cable is connected between the 5L-ANPC and the motor. As it is very clear that a pure sinusoidal wave is achieved which validates well the good performance of the designed filter.

A comparative study between various state-of-the-art converter configurations and the proposed configuration from various aspects is presented in Table II. As presented in Table II, employing hybrid WBG based configuration enables the five-level ANPC converter to operate at very high switching frequency of 100 kHz which leads to remarkable reduction in the value of the passive filter. Moreover, by applying the proposed single carrier modulation method, the first switching harmonic cluster of the output voltage is doubled and odd multiples of the switching harmonic clusters are canceled out which leads to halving the value of the passive filter. In addition, the flying capacitor (FC) is charged and discharged with switching frequency which leads to significant reduction of the FC value and size. Furthermore, an integrated double-stage LC filter is employed in the back-to-back 5L-ANPC topology at both the grid and load sides. A novel design procedure is proposed to optimize the double-stage LC filter size and increase the FC charging speed during the converter start-up. Therefore, combining both advantages of operating at high switching frequency with the GaN devices and of PWM technique that generates first harmonic spectrum at twice the switching frequency, an integrated double-stage filter is obtained. The proposed design presents several features at both AFE and motor side where the filter can be integrated with the overall topology which lead to a reduced size, increased power density when compared to conventional structure. Table III summarized the effect of employing the proposed techniques and approaches on reduction of the value of the passive filter.

As a conclusion, the pure sine bidirectional hybrid WBG based five-level converter with integrated double stage filter was proposed for VFD applications. The proposed bidirectional back-to-back converter can be comprised of back-to-back hybrid WBG based five-level active-neutral-point-clamped (ANPC) converter. In the hybrid WBG based configuration of the five-level ANPC, silicon (Si) based super junction MOSFET devices are employed in the high-voltage low-frequency cell because of very low on-state resistance and conduction losses, and Gallium Nitride (GaN) WBG devices are used in the low-voltage high-frequency cell because of very low switching losses. Accordingly, not only the high power density hybrid WBG based converter can be achieved, but also dv/dt can be remarkably reduced in the attained hybrid WBG based bidirectional converter. Moreover, a novel single carrier sensor-less modulation method was proposed for the five-level AFE rectifier and motor drive to improve harmonic spectrum of the five-level ANPC converter voltage and to provide sensor-less voltage balancing of the dc-link and flying capacitors. By applying the proposed single carrier modulation method, the first switching harmonic cluster of the output voltage is doubled and odd multiples of the switching harmonic clusters are canceled out. Moreover, the flying capacitor (FC) is charged and discharged with switching frequency which leads to significant reduction of the FC value and size. In addition, the novel design procedure was proposed to optimize the double-stage LC filter size and increase the FC charging speed during the converter start-up. The integrated double-stage LC filter with parallel passive damping was proposed to interface the hybrid five-level ANPC converter at both the utility and drive sides. Operating at high switching frequency offers the possibility of filter size reduction which makes the filter integration within the topology possible. The proposed filter structure can be designed to ensure the grid connectivity requirements at the AC mains, while at the motor side it can be designed as a dv/dt filter. In addition, the filter design aims to reach the EMI/EMC standards. The proposed design presented several features at both AFE and motor side where the filter was integrated with the overall topology which leads to a reduced size, increased power density when compared to conventional structure.

desired values without external control by employing the proposed single carrier sensor-less PWM method.

Elimination of the odd multiples of the switching harmonic clusters from the output voltage can be obtained by applying the proposed single carrier sensor-less PWM method to the 5L ANPC converter.

The frequency of first switching harmonic cluster is doubled and then the filter size can be notably reduced by applying the proposed single carrier sensor-less PWM method.

Equal power loss distribution between high frequency (HF) GaN power devices can be obtained.

The FC can be charged and discharged in one switching period. So, the value of FC can be significantly decreased and the power density of the 5L ANPC converter can be increased.

TABLE II

Comparison between Various State-of-the-art and the Proposed VFDs

| Configuration | Switching Frequency | Power Devices | Efficiency | Inductor Value (p.u.) | Power Density | Separated EMI Filter | Integrated Harmonic and EMI Filters |
|---|---|---|---|---|---|---|---|
| Two-level H-Bridge | 4 kHz | Silicon IGBT | Around 95% | 200 | Low | Yes | No |
| Five-level ANPC | 4 kHz | Silicon IGBT | Around 96% | 50 | Medium | Yes | No |
| Hybrid WBG based Five-level ANPC with Integrated Double-Stage Filter | 100 kHz | Hybrid Silicon MOSFET and GaN | More than 98% | 1 | High | No | Yes |

TABLE III

Effect of Applied Techniques on Inductor Value Reduction

| | | Effect of Various Parameters on Reduction of Inductor Value | | | |
|---|---|---|---|---|---|
| Configuration | Inductor Value (p.u.) | Switching Frequency & Type of Utilized Devices | Modulation Method for Switching Harmonic Cancellation | Number of Output Voltage Levels | Total |
| Two-level H-Bridge | 200 | 1 | 1 | 1 | 1 |
| Five-level ANPC | 50 | 1 | 1 | 4 | 4 |
| Hybrid WBG based Five-level ANPC with Integrated Double-Stage Filter | 1 | 25 | 2 | 4 | 200 |

In some examples of the present disclosure a hybrid WBG based configuration of the five-level ANPC converter is proposed to increase the power density and decrease dv/dt of hybrid WBG based converter in same time. In some embodiments of the hybrid WBG based configuration of the five-level ANPC, silicon (Si) based super junction MOSFET devices may be employed in the high-voltage low-frequency cell because of very low on-state resistance and conduction losses.

In some examples of the WBG based, the configuration of the five-level ANPC, Gallium Nitride (GaN) WBG devices are used in the low-voltage high-frequency cell because of very low switching losses.

Decoupled control can be achieved by employing the proposed single carrier sensor-less PWM method.

The flying capacitor (FC) voltage as well as dc-link capacitors voltages are automatically regulated to their Less hardware needed for the control due to use one PWM carrier and two pseudo functions and sensor-less control of the voltages of the capacitors.

A novel design procedure is proposed to optimize the double-stage LC filter size and increase the FC charging speed during the converter start-up. Therefore, combining both advantages of operating at high switching frequency with the GaN devices and of PWM technique that generates first harmonic spectrum at twice the switching frequency, an integrated double-stage filter can be obtained.

The design of an optimized integrated double-stage LC filter for AFE applications is proposed. The design of an optimized integrated double-stage LC filter for dv/dt long-cable fed applications is disclosed.

Pure sine bidirectional hybrid WBG based five-level converter with integrated double stage filter can be attained.

In one example, the hybrid WBG based configuration of the five-level ANPC converter may increase the power density and decrease dv/dt of hybrid WBG based converter in same time. In some embodiments, a single carrier sensor-less PWM method may be used for the 5L ANPC converter. Decoupled control may be achieved by employing the proposed single carrier sensor-less PWM method.

In some examples, the flying capacitor (FC) voltage as well as dc-link capacitors voltages are automatically regulated to their desired values without external control by employing the proposed single carrier sensor-less PWM method.

In some embodiments, the elimination of the odd multiples of the switching harmonic clusters from the output voltage can be obtained by applying the proposed single carrier sensor-less PWM method to the 5L ANPC converter.

In one example, the frequency of first switching harmonic cluster is doubled and then the filter size may be notably reduced by applying the proposed single carrier sensor-less PWM method. Equal power loss distribution between high frequency (HF) GaN power devices may be obtained.

In some examples, the converter may have a novel design procedure is proposed to optimize the double-stage LC filter size and increase the FC charging speed during the converter start-up. Therefore, combining both advantages of operating at high switching frequency with the GaN devices and of PWM technique that generates first harmonic spectrum at twice the switching frequency, an integrated double-stage filter can be obtained. The design of an integrated double-stage LC filter for AFE applications disclosed. In another example, the design of an integrated double-stage LC filter for dv/dt long-cable fed applications is proposed. In one embodiment of the present disclosure, pure sine bidirectional hybrid WBG based five-level converter with integrated double stage filter can be attained.

In some examples, a hybrid WBG based configuration of the five-level ANPC converter is proposed to increase the power density and decrease dv/dt of hybrid WBG based converter in same time.

In some examples, a single carrier sensor-less PWM method is proposed for the 5L ANPC converter to improve the output voltage frequency spectrum, to reduce the FC size, to reduce the integrated passive filter size, to reduce complexity and computational burden, to reduce the number of sensors in the overall system.

In some examples, a novel design procedure is proposed to optimize the double-stage LC filter size to increase the FC charging speed during the converter start-up, to increase power density of the overall system, and to achieve integrated pure sine converter at both AFE and VFD sides.

What is claimed is:

1. A power converter apparatus comprising:
a multi-level power converter circuit having:
an input for receiving one of AC power and DC power, and an output for providing one of DC power and AC power, respectively;
a high voltage, low frequency cell connected to said input, said high voltage, low frequency cell comprising an arrangement of first switches and at least one high voltage capacitor;
a low voltage, high frequency cell connected to said high voltage, low frequency cell, said low voltage, high frequency cell comprising an arrangement of second wide bandgap (WBG) based switches and at least one low voltage capacitor;
a controller connected to gates of said first switches and to gates of said second switches, said controller defining a switching frequency of said second switches; and
said multi-level power converter circuit being configured to produce a first harmonic cluster in an output voltage at twice said switching frequency;
a multi-stage filter connected to said converter circuit, said multi-stage filter providing: (a) low impedance at said switching frequency for voltage balancing of said at least one low voltage capacitor; and (b) reduction of harmonics and switching noise creating by said second switches.

2. The apparatus as defined in claim 1, wherein said controller is configured for single carrier sensor-less PWM operation.

3. The apparatus as defined in claim 1- or 2, wherein said multi-level power converter circuit is a five-level ANPC converter.

4. The apparatus as defined in claim 1, 2 or 3, wherein said multi-stage filter is configured to increase the FC charging speed during converter start-up.

5. The apparatus as defined in claim 1, wherein said power converter circuit is a back-to-back bidirectional converter.

6. The apparatus as defined in claim 1, wherein said power converter circuit is an AC motor controller of the type converting AC mains power into a variable frequency and variable voltage AC motor drive output.

7. The apparatus as defined in claim 1, wherein said first switches comprise WBG based switches.

8. The apparatus as defined in claim 1, wherein said WBG based switches comprise GaN based switches.

9. The apparatus as defined in claim 1, wherein said WBG based switches comprise SiC based switches.

10. The apparatus as defined in claim 1, wherein said apparatus can provide output power compliant with EMI/EMC standards.

* * * * *